United States Patent
Harada et al.

(10) Patent No.: US 8,996,913 B2
(45) Date of Patent: Mar. 31, 2015

(54) DATA TRANSFER CONTROL DEVICE AND DATA TRANSFER CONTROL METHOD

(75) Inventors: Masaaki Harada, Kanagawa (JP); Yuusaku Ohta, Osaka (JP); Satoru Kuriki, Aichi (JP); Satomi Amano, Gifu (JP); Hideki Taniguchi, Aichi (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 186 days.

(21) Appl. No.: 13/810,724

(22) PCT Filed: Jul. 13, 2011

(86) PCT No.: PCT/JP2011/004012
§ 371 (c)(1),
(2), (4) Date: Jan. 17, 2013

(87) PCT Pub. No.: WO2012/014400
PCT Pub. Date: Feb. 2, 2012

(65) Prior Publication Data
US 2013/0124929 A1 May 16, 2013

(30) Foreign Application Priority Data
Jul. 27, 2010 (JP) ................................ 2010-168217

(51) Int. Cl.
*G06F 11/00* (2006.01)
*G06F 11/07* (2006.01)
*G06F 13/28* (2006.01)

(52) U.S. Cl.
CPC .............. *G06F 11/006* (2013.01); *G06F 11/00* (2013.01); *G06F 11/0751* (2013.01); *G06F 13/28* (2013.01)
USPC ............................................ 714/18; 714/748

(58) Field of Classification Search
CPC .............. G06F 11/1402; G06F 11/141; G06F 11/1443; G06F 12/0835
USPC ...................................... 714/5.11, 15, 18, 748
See application file for complete search history.

(56) References Cited

U.S. PATENT DOCUMENTS 5,696,989 A * 12/1997 Miura et al. .................... 710/24
6,163,815 A * 12/2000 Fields et al. .................... 710/6
(Continued)

FOREIGN PATENT DOCUMENTS

| CN | 1591374 A | 3/2005 |
| JP | 02-181248 A | 7/1990 |

(Continued)

OTHER PUBLICATIONS

International Search Report for PCT/JP2011/004012 dated Sep. 13, 2011.

*Primary Examiner* — Marc Duncan
(74) *Attorney, Agent, or Firm* — Pearne & Gordon LLP

(57) ABSTRACT

The data transfer control device of the present invention is capable of improving data transfer efficiency while discarding error data, a DMA parameter storing control unit (1112) temporarily stores parameters to a store resource; a data processing unit (1201) performs error detection processing for data that is transferred; a DMA parameter return control unit (1122) causes parameters used at transfer time of data for which the processing result in the error detection processing was an error to be returned as parameters for subsequent data transfer use from the store resource; and a completion notification delay control unit (1121), with regard to the parameters, causes the completion notification to a host system that indicates that data transfer has completed normally for each of the parameters to wait for normal completion of data transfer that uses parameters that had been set earlier than each of the first-mentioned parameters.

14 Claims, 13 Drawing Sheets

(56) References Cited

U.S. PATENT DOCUMENTS

| | | |
|---|---|---|
| 6,199,121 B1 * | 3/2001 | Olson et al. .................... 710/24 |
| 6,345,320 B1 * | 2/2002 | Kawamata et al. ............. 710/22 |
| 6,543,014 B1 * | 4/2003 | Okuyama et al. .............. 714/712 |
| 7,551,638 B2 * | 6/2009 | Trainin ........................... 370/429 |
| 7,788,437 B2 * | 8/2010 | Schlansker et al. ............ 710/305 |
| 2001/0021984 A1 * | 9/2001 | Kim ................................. 714/18 |
| 2005/0050241 A1 | 3/2005 | Furuta et al. |
| 2005/0108446 A1 * | 5/2005 | Inogai ............................. 710/20 |
| 2006/0179185 A1 * | 8/2006 | Daly et al. ...................... 710/39 |
| 2007/0208820 A1 * | 9/2007 | Makhervaks et al. ......... 709/212 |
| 2008/0168191 A1 * | 7/2008 | Biran et al. ..................... 710/23 |
| 2010/0107008 A1 * | 4/2010 | Radulescu et al. .............. 714/18 |
| 2010/0275087 A1 * | 10/2010 | Doppler et al. ................ 714/749 |

FOREIGN PATENT DOCUMENTS

| | | |
|---|---|---|
| JP | 07-036820 A | 2/1995 |
| JP | 11-212900 A | 8/1999 |
| JP | 2001-075917 A | 3/2001 |
| JP | 2005-56067 A | 3/2005 |

* cited by examiner

| No. | ch | ERROR ID | PROCESSING RESULT | STATUS |
|---|---|---|---|---|
| (1) | 1 | 1 | ERROR | COMPLETE |
| (2) | 1 | 0 | CORRECT | COMPLETE |
| (3) | 1 | 0 | CORRECT | COMPLETE |
| (4) | 2 | 1 | ERROR | TRANSFER IN PROGRESS |
| (5) | 1 | 2 | ERROR | TRANSFER IN PROGRESS |
| (6) | 1 | 1 | CORRECT | TRANSFER IN PROGRESS |
| ... | ... | ... | ... | ... |

FIG. 3

COMPLETION NOTIFICATION QUEUE FOR DMA CHANNEL 1

| No. | ch | ERROR ID | PROCESSING RESULT | STATUS |
|-----|-----|----------|-------------------|--------|
| (1) | 1 | 1 | ERROR | COMPLETE |
| (2) | 1 | 0 | CORRECT | COMPLETE |
| (3) | 1 | 0 | CORRECT | COMPLETE |
| (4) | 1 | 0 | CORRECT | COMPLETE |
| (5) | 1 | 2 | ERROR | TRANSFER IN PROGRESS |
| (6) | 1 | 1 | CORRECT | TRANSFER IN PROGRESS |
| ... | ... | ... | ... | ... |

COMPLETION NOTIFICATION QUEUE FOR DMA CHANNEL 2

FIG. 11

DATA TRANSFER CONTROL DEVICE AND DATA TRANSFER CONTROL METHOD

TECHNICAL FIELD

The claimed invention relates to a data transfer control apparatus and a data transfer control method that enhance data transfer efficiency by means of a queuing mechanism for descriptors and transfer parameters.

BACKGROUND ART

In recent years, high-speed IO interfaces, such as SD eXtended capacity (SDXC), universal serial bus (USB), and serial advanced technology attachment (SATA) have become increasingly fast. There has been proposed data transfer technology that achieves more efficient data transfer without compromising the high-speed throughput features of IO interfaces in executing a plurality of data transfers between a buffer in an IO interface and a main storage apparatus has also been proposed. For example, PTLs 1 and 2 propose direct memory access (DMA) transfer technology that uses descriptors.

For example, PTL 1 discloses a technique that allows, through DMA transfer that uses descriptors, detection of a data error during data transfer while also reducing the load on a host central processing unit (CPU). More specifically, upon detection of an error during data transfer, a DMA controller (DMAC: data transfer control apparatus) performs data transfer reusing the same DMA parameter as that which was used for transferring the data in which the error was detected. The parameter used for data transfer (hereinafter called "DMA parameter") may include, for example, data transfer source address, transfer destination address, and transfer data size. In other words, the error data is overwritten by data transferred successfully using the same DMA parameter. This allows the data transfer control apparatus to discard the error data. Thus, the DMA transfer of PTL 1 achieves an increase in total throughput (more efficient data transfer) by discarding error data without any processing at the host CPU.

PTL 2 discloses making data transfer parallel by providing a queuing mechanism for DMA parameter settings and DMA activation requests, thus achieving more efficient data transfer.

CITATION LIST

Patent Literature

PTL 1
Japanese Patent Application Laid-Open No, HEI2-181248
PTL 2
Japanese Patent Application Laid-Open No. HEI11-212900

SUMMARY OF INVENTION

Technical Problem

However, with the related art described in PTL 1, in the event of an error, the DMA parameter used for the transfer of error data is also used for the transfer of subsequent data. Thus, the data transfer control apparatus described in PTL 1 has to wait for the previous transfer process to complete before starting the subsequent transfer process. As a result, with the data transfer control apparatus described in PTL 1, an interval is created between DMA transfers (a period in which no data can be transferred is created), thereby reducing data transfer efficiency. In other words, while the related art described in PTL 1 is capable of discarding error data, it does so at the expense of data transfer efficiency.

In contrast, the related art described in PTL 2 queues DMA parameter settings and DMA activation requests. This allows subsequent data transfer to be started immediately after completion of the previous data transfer, thereby increasing data transfer efficiency. The related art described in PTL 2, however, has a drawback in that when an error occurs during a given data transfer, the data transfer following the data transfer in which the error occurred may have already started. In this case, if the data transfer following the data transfer in which the error occurred is successfully completed, a host system of the data transfer control apparatus would recognize the data transfer in which the error occurred as having been completed as well. Accordingly, the DMA parameter used for the data transfer in which the error occurred cannot be used for subsequent data transfers, and error data cannot be discarded. In other words, while the related art described in PTL 2 may be capable of improving data transfer efficiency, it is incapable of discarding error data.

It is an object of the claimed invention to provide a data transfer control apparatus and a data transfer control method capable of enhancing data transfer efficiency while discarding error data in DMA transfer where error detection is performed on transferred data.

Solution to Problem

A first aspect of the claimed invention provides a data transfer control apparatus which capable of accepting, during data transfer, an activation request for a subsequent data transfer and a parameter setting used for data transfer, and which processes, in a set order, a plurality of activation requests made by a host system, the data transfer control apparatus including: a backup control section that temporarily backs up a plurality of parameters in a backup resource; a data processing section that performs an error detection process on transferred data; a restoration control section that restores, from the backup resource and as a parameter for subsequent data transfers, a parameter used to transfer data for which the processing result of the error detection process is an error; and a completion notification control section that withholds a completion notification to the host system indicating, with respect to the plurality of parameters, that a data transfer using each parameter has been completed successfully, the completion notification being withheld until a data transfer using a parameter for which the set order is earlier than that of the each parameter is completed successfully.

A second aspect of the claimed invention provides a data transfer control method for a data transfer control apparatus which is capable of accepting, during data transfer, an activation request for a subsequent data transfer and a parameter setting used for data transfer, and which processes, in a set order, a plurality of activation requests made by a host system, the method including the steps of: temporarily backing up a plurality of parameters in a backup resource; performing an error detection process on transferred data; restoring, from the backup resource and as a parameter for subsequent data transfers, the parameter that was used to transfer data for which a processing result of the error detection process is an error; and withholding a completion notification to the host system indicating, with respect to the plurality of parameters, that a data transfer using each parameter has been completed successfully, the completion notification being withheld until a data transfer using a parameter for which the set order precedes that of the each parameter is completed successfully.

Advantageous Effects of Invention

According to the claimed invention, with respect to DMA transfer in which error detection is performed on transferred data, it is possible to improve data transfer efficiency while also discarding error data.

BRIEF DESCRIPTION OF DRAWINGS

FIG. 3 illustrates an example of a completion notification queue in accordance with Embodiment 1 of the claimed invention;

FIG. 11 illustrates an example of another completion notification queue in accordance with the claimed invention;

DESCRIPTION OF EMBODIMENTS

Figure 1:
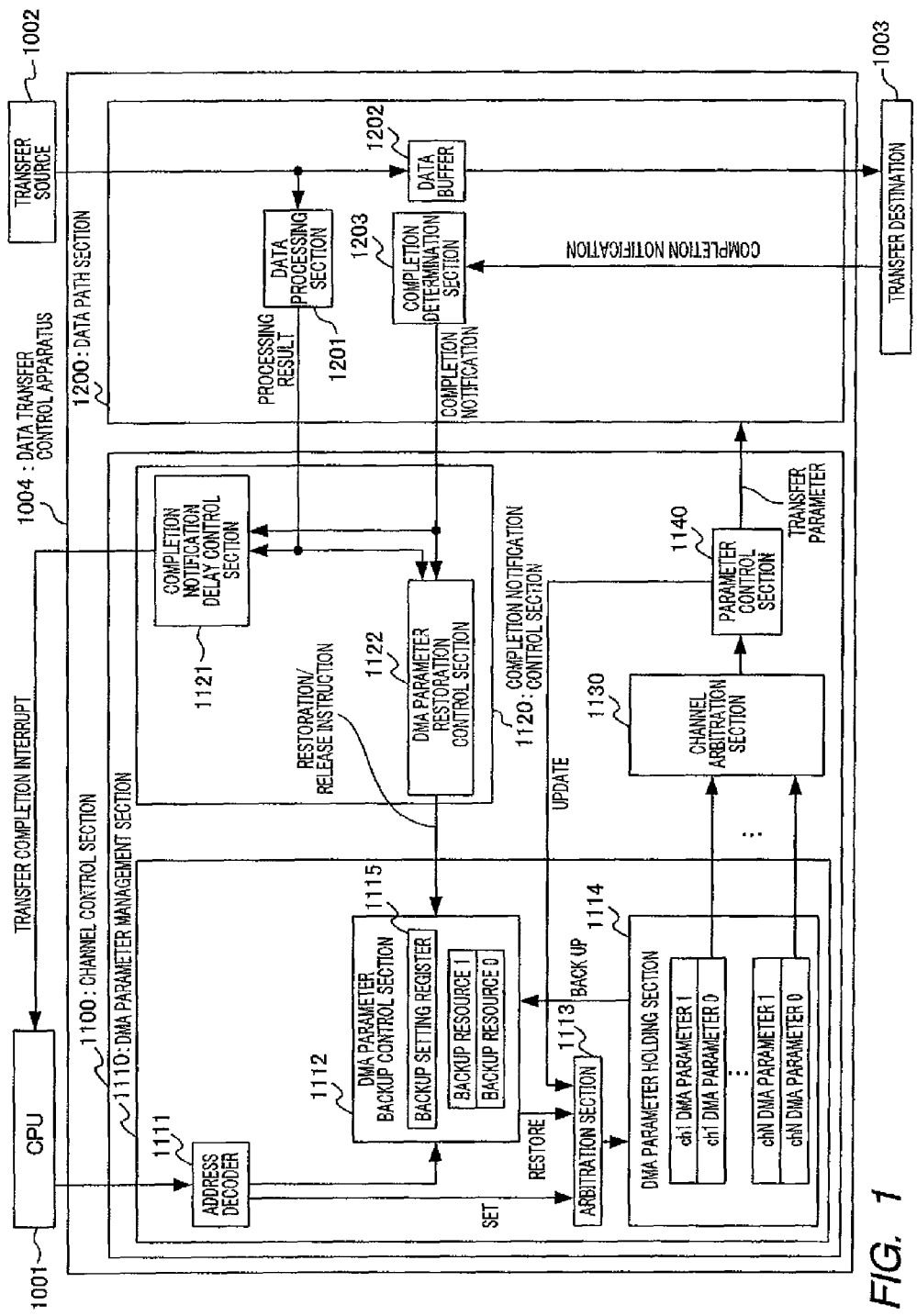
FIG. 1 is a block diagram illustrating a configuration of a data transfer system in accordance with Embodiment 1 of the claimed invention.

Embodiments of the claimed invention are described in detail below with reference to the accompanying drawings. In the following description, components with like functionality are designated with like reference numerals, while descriptions thereof are omitted. The embodiments described below are given as examples, and system configurations and functional block configurations are by no means limited thereto.

Embodiment 1

FIG. 1 illustrates a configuration of a data transfer system in accordance with this embodiment. As shown in FIG. 1, the data transfer system includes CPU 1001, data transfer control apparatus 1004, transfer source 1002 and transfer destination 1003. In FIG. 1, CPU 1001 sets DMA parameters, which are transfer parameters for data including transfer source address, transfer destination address, and transfer data size.

Transfer source 1002 is, for example, an SDIO interface, SATA interface or USB interface and transfers data to transfer destination 1003 via data transfer control apparatus 1004.

Transfer destination 1003 is, for example, DRAM, which is used as a main storage apparatus and receives data from transfer source 1002 via data transfer control apparatus 1004. Transfer destination 1003 sends, to CPU 1001 via data transfer control apparatus 1004, a completion notification indicating completion of data transfer from transfer source 1002. Upon reception of the completion notification, CPU 1001 recognizes that data preceding the data corresponding to the completion notification has been successfully received by transfer destination 1003.

In accordance with DMA parameters set by CPU 1001, data transfer control apparatus 1004 reads data from transfer source 1002 and controls data transfer to transfer destination 1003. Data transfer control apparatus 1004 is configured to accept, while data transfer is being executed for some data, activation requests and DMA parameter settings for subsequent data transfers. Data transfer control apparatus 1004 uses, in a set order, a plurality of DMA parameters set by CPU 1001, which is a host system.

As shown in FIG. 1, data transfer control apparatus 1004 includes two main functional blocks, i.e., channel control section 1100 and data path section 1200. Channel control section 1100 manages DMA parameters set by CPU 1001 and generates transfer parameters to be issued to transfer source 1002 and transfer destination 1003. Meanwhile, data path section 1200 controls the reading of data from transfer source 1002 and the transfer of data to transfer destination 1003. A configuration of data transfer control apparatus 1004 is described in detail below.

The configuration of channel control section 1100 in data transfer control apparatus 1004 shown in FIG. 1 will now be described.

In FIG. 1, channel control section 1100 includes DMA parameter management section 1110, completion notification control section 1120, channel arbitration section 1130, and parameter control section 1140.

DMA parameter management section 1110 includes address decoder 1111, DMA parameter backup control section 1112, arbitration section 1113, and DMA parameter holding section 1114.

Address decoder 1111 receives an address from CPU 1001, identifies a parameter indicating an access destination and issues an access request to DMA parameter backup control section 1112 and DMA parameter holding section 1114. The access request to DMA parameter holding section 1114 undergoes arbitration with other access requests at arbitration section 1113 as discussed below.

DMA parameter backup control section 1112 temporarily backs up a DMA parameter (backed up DMA parameter) received from DMA parameter holding section 1114 in a backup resource that holds backed up DMA parameters. DMA parameter backup control section 1112, as shown in FIG. 1, includes backup resource 0 and backup resource 1 as backup resources that hold backed up DMA parameters. By way of example, with respect to backup resources, there may be cases where, for each DMA channel, backup resource 0 and backup resource 1 shown in FIG. 1 are provided, or where three or more backup resources are provided. DMA parameter backup control section 1112 controls restoration and release of DMA parameters held in backup resource 0 or 1 in accordance with a restoration instruction or release instruction from DMA parameter restoration control section 1122 in completion notification control section 1120. DMA parameter restoration control section 1122 in completion notification control section 1120 will hereinafter be described.

Backup setting register 1115 in DMA parameter backup control section 1112 holds settings related to a backup control process for DMA parameters (e.g., the number of backup resources, and/or the like).

Arbitration section 1113 arbitrates DMA parameters received from address decoder 1111 (DMA parameter setting request) and DMA parameters received from DMA parameter backup control section 1112 (DMA parameter restoration request). Arbitration section 1113 arbitrates updated DMA parameters received from parameter control section 1140 (DMA parameter update request). Arbitration section 1113 outputs these DMA parameters to DMA parameter holding section 1114 in accordance with the arbitration results.

DMA parameter holding section 1114 holds the DMA parameters received from arbitration section 1113. Upon DMA activation, DMA parameter holding section 1114 backs up DMA parameters (e.g., address, size, and/or the like) on DMA parameter backup control section 1112 in accordance with the settings of backup setting register 1115. More specifically, DMA parameter holding section 1114 backs up, on DMA parameter backup control section 1112, the pre-update values of, of all the DMA parameters, those that are going to be updated at parameter control section 1140 during data transfer. Upon receiving an updated DMA parameter from parameter control section 1140 via arbitration section 1113, DMA parameter holding section 1114 updates the corresponding DMA parameter among the DMA parameters held by DMA parameter holding section 1114. Upon receiving a restored DMA parameter from DMA parameter backup control section 1112 via arbitration section 1113, DMA parameter holding section 1114 updates the corresponding DMA parameter among the DMA parameters that it holds. Thus, DMA parameter holding section 1114 restores the corresponding DMA parameter to its pre-update state.

DMA parameter holding section 1114 holds DMA parameters for each DMA channel. DMA parameter holding section 1114 includes, for each DMA channel, a plurality of resources for accepting, in advance, DMA parameters to be used for subsequent data transfers. Thus, DMA parameter holding section 1114 is provided with a DMA parameter queuing mechanism for each DMA channel. For example, in the example in FIG. 1, two resources are provided for each of N DMA channels, from DMA channel 1 (ch1) to DMA channel N (chN). For example, two resources, namely "ch1 DMA parameter 0" and "ch1 DMA parameter 1" are provided for DMA channel 1 (ch1). N indicates an integer equal to or greater than 1. This embodiment also encompasses cases where there is just one DMA channel.

By way of example, for DMA channel 1 (ch1), DMA parameters are stored in the following order: ch1 DMA parameter 0; ch1 DMA parameter 1. The DMA parameter stored in ch1 DMA parameter 0 corresponds to the current data transfer, and the DMA parameter stored in ch1 DMA parameter 1 corresponds to the next data transfer. The transfer size indicated by the DMA parameter stored in ch1 DMA parameter 0 (e.g., remaining transfer size) is updated to 0 through a parameter update at parameter control section 1140 (i.e., the remaining transfer size is updated to 0). Then, the DMA parameter stored in ch1 DMA parameter 1 is shifted to ch1 DMA parameter 0, and the next data transfer referencing the DMA parameter that has been shifted to ch1 DMA parameter 0 is started. Alternatively, the transfer size indicated by the DMA parameter stored in ch1 DMA parameter 0 (e.g., remaining transfer size) is updated to 0 through a parameter update at parameter control section 1140 (i.e., the remaining transfer size is updated to 0). Then, the DMA parameter to be referenced for the next data transfer shifts from ch1 DMA parameter 0 to ch1 DMA parameter 1 and the next data transfer referencing the DMA parameter stored in ch1 DMA parameter 1 may be started.

With respect to DMA parameter holding section 1114 shown in FIG. 1, descriptions are provided for a case where there are two resources that hold DMA parameters for each DMA channel. However, there may instead be three or more resources that hold DMA parameters for each DMA channel. In the above description, with respect to DMA parameter switching timing, the DMA parameter for DMA channel 1 (ch1) is switched, for example, from ch1 DMA parameter 0 to ch1 DMA parameter 1. The DMA parameter switching timing, however, is not limited to cases where a command for a predetermined size is generated at parameter control section 1140 and switching takes place when the remaining transfer size reaches zero. For example, with respect to the DMA parameter switching timing, the DMA parameter may be switched once the last transfer is completed after the remaining transfer size has reached zero.

FIG. 1 shows a configuration where DMA parameter holding section 1114 backs up a DMA parameter set by CPU 1001 on another resource (i.e., DMA parameter backup control section 1112) and updates the set DMA parameter during transfer. In another conceivable case, DMA parameter holding section 1114 may also hold the DMA parameter set by CPU 1001 as is, load to another resource the DMA parameter to be updated during transfer, and then update the DMA parameter on that other resource.

In FIG. 1, completion notification control section 1120 in channel control section 1100 includes completion notification delay control section 1121, and DMA parameter restoration control section 1122.

Completion notification delay control section 1121 receives a completion notification from completion determination section 1203. The completion notification is a completion notification for a data transfer for each DMA channel, and which enables, while a plurality of data transfers are being executed through the same DMA channel, identification as to which DMA parameter is used by a given data transfer. Completion notification delay control section 1121 likewise receives a processing result from data processing section 1201. This processing result is a processing result for each DMA channel (for example, the presence or absence of an error), and is a notification that enables, when a plurality of data transfers are being executed through the same DMA channel, identification as to which DMA parameter is used by the corresponding data transfer.

If a completion notification corresponds to a transfer for data whose processing result is an error (error packet), completion notification delay control section 1121 discards the completion notification. In a certain case discussed below, completion notification delay control section 1121 withholds a completion notification for a data transfer that uses another DMA parameter different from the DMA parameter used during the data transfer corresponding to the discarded completion notification without notifying CPU 1001. The DMA parameter used during the data transfer corresponding to the discarded completion notification is refereed to as "DMA parameter A" below. The certain case referred to above is one where a data transfer using a DMA parameter distinct from DMA parameter A is successfully completed within a given period. This given period is the period from the data transfer corresponding to the discarded completion notification up to when a data transfer performed by restoring DMA parameter A as a DMA parameter for subsequent data transfers is successfully completed. Once the data transfer using DMA parameter A is successfully completed, completion notification delay control section 1121 sends to CPU 1001 a completion notification for the data transfer using DMA parameter A (transfer completion interrupt). Along with the completion notification for the data transfer using DMA parameter A, completion notification delay control section 1121 sends to CPU 1001 the completion notification that was being withheld (the completion notification for the data transfer using the other DMA parameter) (transfer completion interrupt). In other words, the completion notifications to CPU 1001 indicate successful completion of the data transfers using the respective DMA parameters.

With respect to a plurality of DMA parameters set by CPU 1001, completion notification delay control section 1121 withholds (delays) completion notification to CPU 1001 until a data transfer using a DMA parameter with an earlier set order is successfully completed.

Completion notification delay control section 1121 may individually send the completion notification for the data transfer using DMA parameter A and the withheld completion notification for the data transfer using the other DMA parameter to CPU 1001 one by one. Alternatively, completion notification delay control section 1121 may send the completion notification for the data transfer using DMA parameter A and the withheld completion notification for the data transfer using the other DMA parameter to CPU 1001 as a single transfer completion interrupt. By thus sending a single collective notification, completion notification delay control section 1121 can reduce the load on CPU 1001.

Details of the completion notification process at completion notification delay control section 1121 are discussed hereinafter.

In a certain case discussed below, DMA parameter restoration control section 1122 instructs DMA parameter backup control section 1112 to restore (reset) a certain DMA parameter from a backup resource to DMA parameter holding section 1114 as a DMA parameter for subsequent data transfers. Specifically, DMA parameter restoration control section 1122 sends to DMA parameter backup control section 1112 a restoration request for a certain DMA parameter. The certain case referred to above is one where the processing result received from data processing section 1201 (described hereinafter) indicates an anomaly (error present). The certain DMA parameter is, of the DMA parameters backed up upon DMA activation the DMA parameter that was used to transfer the data for which the processing result at data processing section 1201 was an error.

Data for which an error was detected (error packet) is transferred to transfer destination 1003 (for example, DRAM). The error packet is a packet that resulted in a cheek sum error and that was received, for example, from a wireless LAN device via an SDIO interface. Data transfer control apparatus 1004 restores the DMA parameter that was used to transfer the error packet, and uses the same DMA parameter again to transfer a packet received subsequently. Thus, at data transfer control apparatus 1004, the error packet of transfer destination 1003 (DRAM) is overwritten with the received packet, consequently making it possible to only store correct packets at transfer destination 1003 (DRAM).

Meanwhile, in a certain case discussed below, DMA parameter restoration control section 1122 instructs DMA parameter backup control section 1112 to release (discard) a certain DMA parameter from a backup resource, namely, DMA parameter restoration control section 1122 sends to DMA parameter backup control section 1112 a release request for a certain DMA parameter. The certain case referred to above is one where the processing result received from data processing section 1201 (described hereinafter) indicates that it is correct (no error), and where a completion notification for a data transfer for data whose processing result is correct is received from completion determination section 1203 (described hereinafter). The certain DMA parameter is, of the DMA parameters backed up upon DMA activation, the DMA parameter that was used to transfer the data for which the processing result at data processing section 1201 was correct.

Channel arbitration section 1130 arbitrates DMA requests for a plurality of DMA channels received from DMA parameter holding section 1114. Channel arbitration section 1130 outputs a DMA parameter for each DMA channel to parameter control section 1140 in accordance with arbitration results.

Parameter control section 1140 generates transfer parameters (address, size, and/or the like) based on the DMA parameters received from channel arbitration section 1130, and outputs the generated transfer parameters to data path section 1200. For example, parameter control section 1140 generates a transfer parameter that instructs the transfer of a given size's worth of data relative to the size of the transfer data. In addition to generating the transfer parameter, parameter control section 1140 outputs an updated DMA parameter to arbitration section 1113, the updated DMA parameter being the remaining transfer size obtained by subtracting the given size from the data size indicated by the DMA parameter.

A configuration of data path section 1200 in data transfer control apparatus 1004 shown in FIG. 1 will now be described. Data path section 1200 reads data from transfer source 1002 based on transfer parameters received from parameter control section 1140 in channel control section 1100 and writes the read data to transfer destination 1003. Data path section 1200 includes data processing section 1201, data buffer 1202 and completion determination section 1203.

Data processing section 1201 performs such processes as checksum (an error detection process) and encryption/decryption on the data to be transferred from transfer source 1002 to transfer destination 1003. Data processing section 1201 notifies completion notification delay control section 1121 and DMA parameter restoration control section 1122 of a processing result as to whether the data to be transferred was processed successfully or resulted in an error. In the case of checksum, data processing section 1201 sends as a processing result a notification as to whether or not a checksum error has been detected. If an encryption/decryption process is to be performed, data processing section 1201 sends as a processing result a notification as to whether or not the transfer is of a data size less than the encryption scheme's data unit (abnormal transfer). Data processing section 1201 associates the processing result with DMA channel information. Thus, data processing section 1201 sends a notification for each processing result in a manner that makes it possible to identify which transfer each processing result corresponds to, even if a plurality of transfers of the same DMA channel are being executed.

FIG. 1 illustrates a case where data processing section 1201 processes data that is between transfer source 1002 and data buffer 1202. Data processing section 1201 may process data stored in data buffer 1202, as well as data between data buffer 1202 and transfer destination 1003

Data buffer 1202 temporarily stores data, if necessary, for the purpose of, for example, absorbing differences in transfer rate based on the transfer rate between transfer source 1002 and data transfer control apparatus 1004 and the transfer rate between data transfer control apparatus 1004 and transfer destination 1003.

Completion determination section 1203 receives a data transfer completion notification from transfer destination 1003, and determines transfer completion with respect to data path section 1200 for each DMA channel. Completion determination section 1203 notifies completion notification delay control section 1121 and DMA parameter restoration control section 1122 with a completion notification for each DMA channel. Completion determination section 1203 associates the completion notification with DMA channel information. Thus, completion determination section 1203 sends each completion notification in such a manner that, even if a plurality of data transfers of the same DMA channel are being executed, it is made possible to identify which transfer each completion notification is for.

Figure 2:
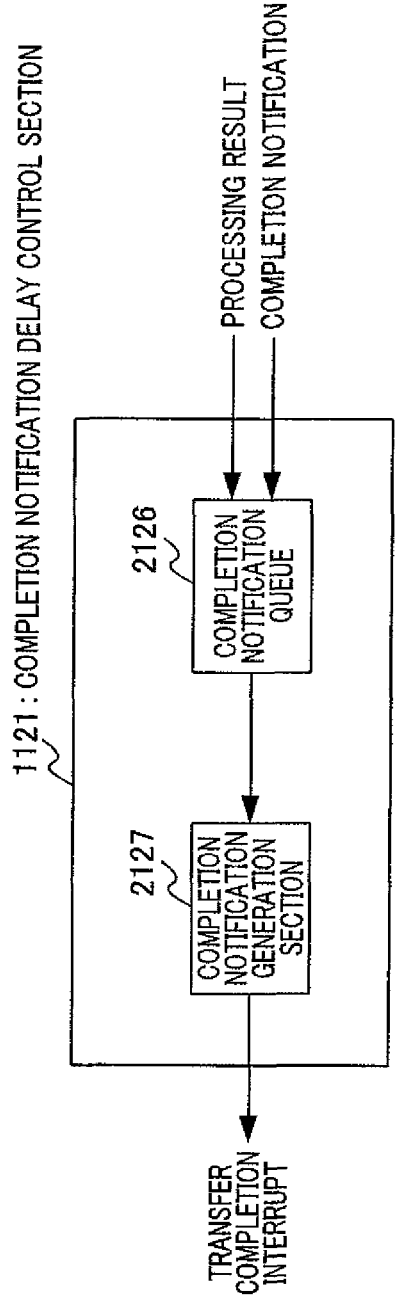
FIG. 2 is a block diagram illustrating an internal configuration of a completion notification delay control section in accordance with Embodiment 1 of the claimed invention.

The completion notification process at completion notification delay control section 1121 will now be described in detail. FIG. 2 illustrates an internal configuration of completion notification delay control section 1121. As shown in FIG. 2, completion notification delay control section 1121 includes completion notification queue 2126 and completion notification generation section 2127.

In FIG. 2, completion notification queue 2126 queues processing results (correct or error) and transfer states (transfer complete or transfer in progress) for transfer data of each DMA channel transferred to transfer destination 1003.

FIG. 3 is an example showing information queued at completion notification queue 2126 (i.e., information managed at completion notification queue 2126). The queued information includes, for example, queue number "no.," DMA channel "ch" for the transfer data, "error ID" for identifying which of the same DMA parameters an error occurred in, "processing result" received from data processing section 1201, and "status" ("complete" or "transfer in progress") indicating whether or not the transfer of transfer data has been completed.

For some DMA channels, data transfer using the next DMA parameter may be started while data transfer using a given DMA parameter is still in progress (i.e., without waiting for the data transfer using the given DMA parameter to complete). Thus, it is anticipated that data transfers using different DMA parameters may result in a plurality of errors on the same DMA channel. As such, DMA parameter restoration control section 1122 assigns the "error ID" shown in FIG. 3 to the DMA parameter when requesting DMA parameter backup control section 1112 to restore a DMA parameter. Specifically, the DMA parameter used by data transfer control apparatus 1004 includes an error ID which indicates whether or not the error detection process at data processing section 1201 has been performed on the data to be transferred using that DMA parameter. Completion notification queue 2126 is notified of the "error ID" along with the "processing result" from data processing section 1201.

As indicated above, error ID is associated with a data transfer using a restored DMA parameter. This allows management by completion notification delay control section 1121 as to, with respect to each error to be stored in completion notification queue 2126 from among a plurality of errors occurring on the same DMA channel, which DMA parameter is used by the data transfer to which each error relates.

In FIG. 3, with respect to each DMA channel, 0 is assigned for "error ID" if "processing result" is "correct." If "processing result" is "error," each DMA parameter is assigned a different "error ID" (a value not less than 1). For example, transfer data no.(1) and transfer data no.(6) shown in FIG. 3 are of the same DMA channel (ch1) and are assigned the same "error ID," namely 1. This indicates that the two are transfer data transferred using the same DMA parameter of the same DMA channel. In other words, transfer data no.(6) in FIG. 3 was transferred by restoring the DMA parameter that was used for transfer data no.(1). Meanwhile, transfer data no.(1) and transfer data no.(5) shown in FIG. 3 are of the same DMA channel (ch1), but are assigned different "error IDs," namely 1 and 2, respectively. This indicates that the two are transfer data transferred using different DMA parameters.

"Status" shown in FIG. 3 becomes "transfer in progress" when a processing result is received from data processing section 1201, and it becomes "complete" when a completion notification is received from completion determination section 1203.

In a certain case discussed below, completion notification queue 2126 does not queue information regarding transfer data corresponding to an error ID reported along with a processing result: The certain case referred to above is one where the "processing result" reported from data processing section 1201 is "error" and the "error ID" notified along with the processing result is the same as an "error ID" of the same DMA channel already queued. What is meant by a case where the "error ID" is the same as an "error ID" of the same DMA channel is a case where a data transfer using a restored DMA parameter resulted in an error again.

Thus, completion notification delay control section 1121 manages processing results ("correct" or "error") and transfer states ("transfer in progress" or "transfer completed") for transfer data transferred using each DMA parameter of each DMA channel through completion notification queue 2126.

Completion notification generation section 2127 references completion notification queue 2126 and controls completion notification output to CPU 1001.

More specifically, if the "processing result" for the transfer data corresponding to a completion notification received from completion determination section 1203 is "error," completion notification generation section 2127 discards the completion notification. Information concerning the transfer data corresponding to the discarded completion notification is queued in completion notification queue 2126. Examples of information concerning transfer data corresponding to a discarded completion notification include information concerning transfer data no.(1), no.(4) and no.(5) (processing result: error) shown in FIG. 3.

In a certain case discussed below, completion notification generation section 2127 directly outputs a completion notification to CPU 1001 (transfer completion interrupt). The certain case referred to above is one where the "processing result" for the transfer data corresponding to a completion notification received from completion determination section 1203 is correct, and where, with respect to the same DMA channel as the DMA channel corresponding to that completion notification, no completion notification with an error "processing result" is queued in completion notification queue 2126. In a certain case discussed below, completion notification generation section 2127 controls completion notification output based on the "processing result" and "error ID" of the transfer data corresponding to a completion notification received from completion determination section 1203. The certain case referred to above is one where, when a completion notification is received from completion determination section 1203, with respect to the same DMA channel as the DMA channel corresponding to that completion notification, a completion notification for transfer data with an error "processing result" is queued in completion notification queue 2126.

More specifically, in a certain case discussed below, completion notification generation section 2127 leaves a received completion notification queued in completion notification queue 2126 instead of directly outputting it to CPU 1001. The certain case referred to above is one where the "processing result" for the transfer data corresponding to the received completion notification is correct, and where the "error ID" of the transfer data corresponding to the received completion notification differs from the "error ID" of queued transfer data (processing result: error) with respect to the same DMA channel. In other words, completion notification generation section 2127 withholds a received completion notification if a DMA parameter with an earlier set order than the DMA parameter used results in an error in a data transfer on the same DMA channel as that corresponding to the received completion notification.

For example, no.(2) in FIG. 3 indicates a case where a completion notification corresponding to the transfer data (ch1, processing result: success, error ID=0) is received. This case is discussed below. In this case, a completion notification for transfer data no.(1) (ch1, processing result: error, error ID=1) (a completion notification with the same DMA channel as, but whose error ID differs from, the received completion notification) is queued in completion notification queue 2126. Completion notification generation section 2127 therefore updates the "status" of transfer data no.(2) to "complete," while keeping it queued in completion notification queue 2126. The same applies to no.(3) in FIG. 3, which indicates a case where a completion notification corresponding to the transfer data (ch1, processing result: success, error ID=0) is received.

Meanwhile, in a certain case discussed below, completion notification generation section 2127 collectively outputs to CPU 1001 the completion notifications queued in completion notification queue 2126 and which are for transfer data whose "processing result" is correct within the same DMA channel. The certain case referred to above is one where the "processing result" of the transfer data corresponding to a received completion notification is correct, and where the "error ID" of the transfer data corresponding to the received completion notification is the same as the "error ID" of queued transfer data (processing result: error) of the same DMA channel.

For example, no.(6) in FIG. 3 indicates a case where a completion notification corresponding to the transfer data (ch1, processing result: success, error ID=1) is received. This case is discussed below. Specifically, transfer data no.(6) is transfer data that has been transferred by restoring the DMA parameter used for transfer data no.(1). In this case, completion notification generation section 2127 outputs to CPU 1001, from among the completion notifications of DMA channel 1 (ch1) queued in completion notification queue 2126, the completion notification for transfer data no.(1) corresponding to transfer data no.(6). Completion notification generation section 2127 further outputs to CPU 1001 completion notifications for transfer data that are subsequent to no.(1) and whose "processing result" is correct (i.e., no.(2) and no.(3)). Completion notification generation section 2127 deletes from completion notification queue 2126 information concerning transfer data nos.(1) to (3), as well as transfer data no.(6), which uses the same DMA parameter as no.(1).

One method for outputting completion notifications for a plurality of pieces of transfer data to a host system (in this case, completion notifications for transfer data nos.(1) to (3) in FIG. 3) is to consolidate completion notifications for a plurality of pieces of transfer data into a single transfer completion interrupt. If the host system is CPU 1001, instead of separately sending completion notifications for a plurality of pieces of transfer data as individual transfer completion interrupts, they are consolidated into and sent as a single transfer completion interrupt. This allows data transfer control apparatus 1004 according to this embodiment to reduce the load on CPU 1001 caused by interrupts.

Likewise, a completion notification for transfer data no.(4) (ch2, processing result: error, error ID=1) in FIG. 3 is output to CPU 1001 upon successful transfer of transfer data of DMA channel 2 (ch2) and error ID=1.

FIG. 3 illustrates an example where, when completion notification queue 2126 receives a "processing result" for transfer data of DMA channel 1 (ch1) and error ID=1, it is newly queued as transfer data no.(6). In this embodiment, however, upon receipt of a "processing result" (correct) for transfer data whose error ID=1, completion notification delay control section 1121 may update the "processing result" from "error" to "correct" and the "status" from "complete" to "transfer in progress."

Figure 4:
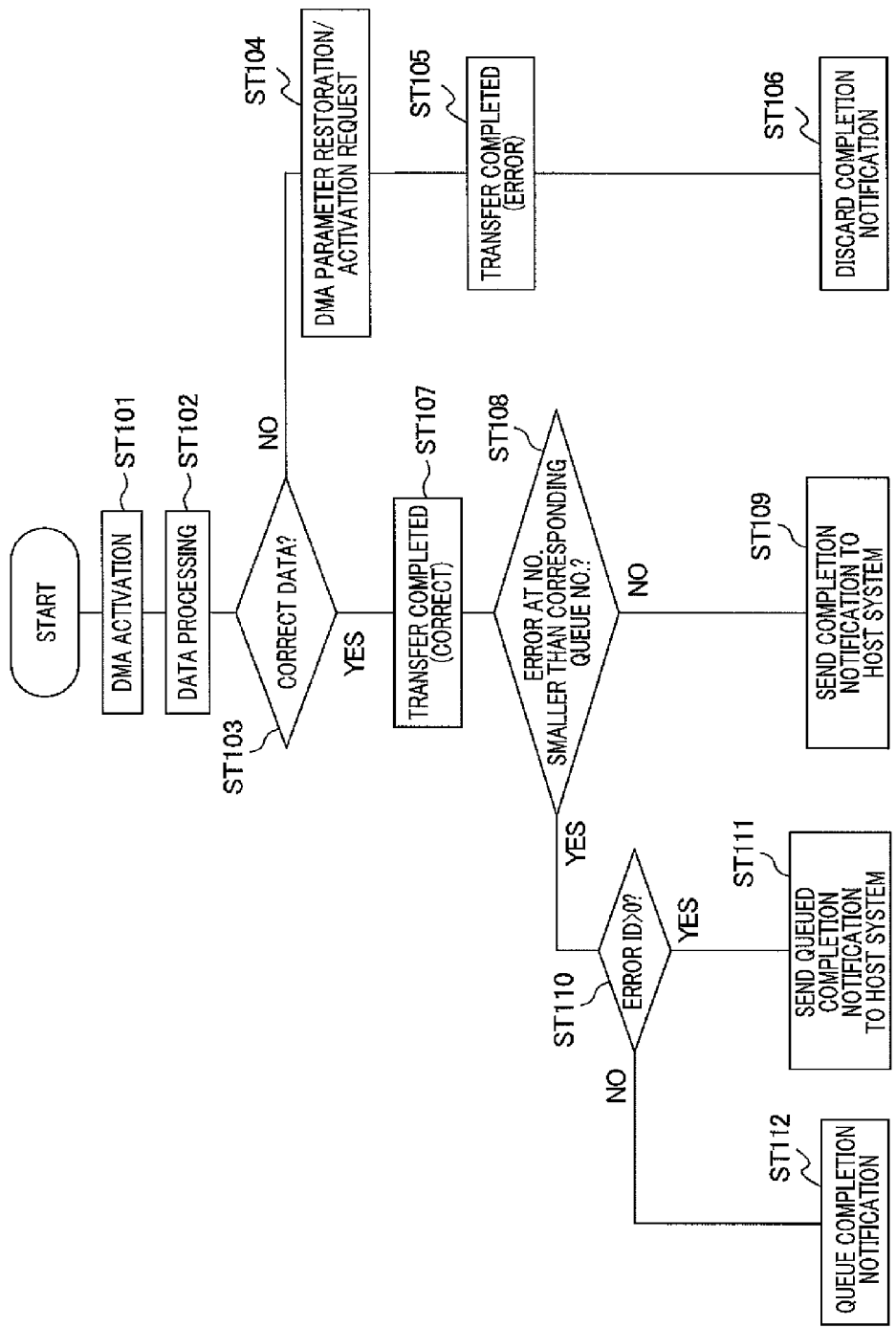
FIG. 4 is a flow chart illustrating a completion notification process flow in accordance with Embodiment 1 of the claimed invention.

A completion notification process flow for data transfer at data transfer control apparatus 1004 will now be described. FIG. 4 is a flow chart illustrating a completion notification process flow for data transfer at data transfer control apparatus 1004.

In step (hereinafter "ST") 101 in FIG. 4, data transfer control apparatus 1004 sets a DMA parameter, activates DMA transfer and starts data transfer.

In ST 102, data transfer control apparatus 1004 (data processing section 1201) performs data processing on transfer data, e.g., checksum (error detection process), and/or the like.

In ST 103, data transfer control apparatus 1004 determines whether or not the processing result (error detection result) for the transfer data in ST 102 is correct. If the processing result is an error (ST 103: NO), the flow proceeds to ST 104. On the other hand, if the processing result is correct (ST 103: YES), the flow proceeds to ST 107.

In ST 104, DMA parameter restoration control section 1122 instructs DMA parameter backup control section 1112 to restore the DMA parameter that was used for the transfer data whose processing result was an error, and performs data transfer again. To this end, DMA parameter restoration control section 1122 issues a restoration request for the DMA parameter that was used for the transfer data whose processing result was an error. DMA parameter restoration control section 1122 also provides the DMA channel number "ch" and "error ID" stored in completion notification queue 2126 (FIG. 3) of completion notification delay control section 1121.

DMA parameter backup control section 1112 uses the provided DMA channel number "ch" to identify a DMA parameter to be restored from among DMA parameters backed up in backup resources. DMA parameter backup control section 1112 uses the provided "error ID" to identify the error to which the transfer using the restored DMA parameter and the processing result by data processing section 1201 (success or error) correspond.

In ST 105, data transfer control apparatus 1004 (completion determination section 1203) receives a transfer completion notification for transfer data (error) from transfer destination 1003.

In ST 106, data transfer control apparatus 1004 (completion notification delay control section 1121) discards the completion notification received in ST 105 for transfer data whose processing result is an error. Information concerning the transfer data corresponding to the discarded completion notification is queued in completion notification queue 2126. Examples of this information concerning transfer data include, for example, information concerning transfer data no.(1), no.(4) and no.(5) (processing result: error) shown in FIG. 3.

In ST 107, data transfer control apparatus 1004 (completion determination section 1203) receives a transfer completion notification for transfer data (correct) from transfer destination 1003.

In ST 108, data transfer control apparatus 1004 (completion notification delay control section 1121) determines whether or not an error has occurred on the same DMA channel as the transfer data whose processing result is correct, of the completion notification received in ST 107. More specifically, completion notification delay control section 1121 determines whether or not an error has occurred in other transfer data transferred before the transfer data for which the completion notification was received (in other words, whether or not transfer data is retransferred using a restored DMA parameter). Specifically, completion notification delay control section 1121 determines whether or not a completion notification for some other transfer data whose processing result is an error is queued at a queue no. smaller than the queue no. of the transfer data for which a completion notification was received in ST 107.

If no completion notification for any other transfer data whose processing result is an error is queued at a queue no. smaller than the queue no. of the transfer data for which a completion notification was received in ST 107 (ST 108: NO), the flow proceeds to ST 109. On the other hand, if a completion notification for some other transfer data whose processing result is an error is queued at a queue no. smaller than the queue no. of the transfer data for which a completion notification was received in ST 107 (ST 108: YES), the flow proceeds to ST 110. In ST 109, completion notification delay control section 1121 sends to the host system (CPU 1001 in this case) the completion notification for transfer data received in ST 107.

In ST 110, completion notification delay control section 1121 determines whether or not the "error ID" of the transfer data for which a completion notification was received in ST 107 is greater than 0 (whether or not error ID>0). Specifically, completion notification delay control section 1121 determines whether or not the transfer of the transfer data for which a completion notification was received in ST 107 is a data transfer that was executed by restoring a DMA parameter due to an error.

If the error ID is greater than 0 (ST 110: YES), and the transfer of the transfer data for which a completion notification was received in ST 107 is a data transfer using a restored DMA parameter (error ID>0 (correct data)), the flow proceeds to ST 111. In ST 111, completion notification delay control section 1121 collectively sends the queued completion notifications for transfer data (the withheld completion notifications) to the host system (CPU 1001 in this case).

In contrast, if the error ID is not greater than 0 (ST 110: NO), that is, if the transfer of the transfer data for which a completion notification was received in ST 107 was not a transfer using a restored DMA parameter, the flow proceeds to ST 112. In this case, completion notification delay control section 1121 determines that data transfer using a DMA parameter that caused an error before that transfer data has not been completed successfully. In other words, the DMA parameter that caused the error is a DMA parameter of an earlier set order than the DMA parameter used for the transfer data for which a completion notification was received in ST 107. Thus, in ST 112, completion notification delay control section 1121 leaves the completion notification for the transfer data for which a completion notification was received in ST 107 queued in completion notification queue 2126 without sending it to CPU 1001.

An example of the data transfer completion notification process shown in FIG. 4 will now be described. The following is a description for a case where completion determination section 1203 shown in FIG. 1 has received a completion notification corresponding to transfer data no.(6) in ST 107. In this case, a completion notification corresponding to transfer data no.(1) is queued in completion notification queue 2126. The completion notification corresponding to transfer data no.(1) is of the same DMA channel (ch1) as the completion notification corresponding to transfer data no.(6). The completion notification corresponding to transfer data no.(1) is a completion notification of a queue no. smaller than queue no.(6) and whose "processing result" is an error (ST 108: YES). The transfer data of queue no.(6) has an "error ID" of 1 (ST 110: YES). Thus, completion notification delay control section 1121 determines that transfer data no.(6) (error ID=1) is transfer data transferred by restoring the DMA parameter used for transfer data no.(1) (error ID=1). Completion notification delay control section 1121 sends to the host system (CPU 1001) the completion notifications corresponding to transfer data of queue no.(1) to no.(3) shown in FIG. 3 (the queued completion notifications) (ST 111).

Described below is a process performed in a certain case discussed below in the period from when transfer data whose "processing result" is an error is transferred up to when a data transfer performed by restoring the DMA parameter used for that transfer is completed successfully. The certain case referred to above is one where the "processing result" for a data transfer using a DMA parameter different from the above-mentioned DMA parameter is an error. In other words, the description here concerns a case where a plurality of error IDs are assigned to the same DMA channel in ST 110 shown in FIG. 4. Only operations for the same DMA channel are described below. In the following, the transfer of transfer data whose "processing result" is an error is referred to as a first data transfer. A DMA parameter that is used in the first data transfer is referred to as a first DMA parameter. A DMA parameter that is different from the first DMA parameter is referred to as a second DMA parameter. A data transfer using the second DMA parameter is referred to as a second data transfer.

Completion notification delay control section 1121 receives, between the first data transfer and the second data transfer, a completion notification for a data transfer that uses a DMA parameter different from both the first DMA parameter and the second DMA parameter and whose "processing result" is correct. The completion notification given here is referred to as a first completion notification. Examples of the first completion notification include completion notifications for transfer data no.(2) and no.(3) shown in FIG. 3. Completion notification delay control section 1121 receives, in the next period, a completion notification for a data transfer that uses a DMA parameter different from both the first DMA parameter and the second DMA parameter and whose "processing result" is correct. The term "next period" as used above refers to the period from the time of the second data transfer up to when a data transfer performed by restoring the first DMA parameter is completed successfully. The completion notification given here is referred to as a second completion notification. The second completion notification is, for example, a completion notification for transfer data (not shown) that exists between no.(5) and no.(6) shown in FIG. 3. Completion notification delay control section 1121 withholds the first completion notification and the second completion notification in an identifiable fashion. Assuming now that the data transfer performed by restoring the first DMA parameter has been completed successfully (at the time of data transfer for no.(6) shown in FIG. 3), in this case, completion notification delay control section 1121 sends to CPU 1001 a completion notification for the data transfer using the first DMA parameter (that is, a completion notification for transfer data no.(1) corresponding to no.(6) shown in FIG. 3) and the first completion notification.

Assuming now that the data transfer performed by restoring the second DMA parameter has been completed successfully (at the time of a data transfer (not shown) later than the data transfer for no.(6) shown in FIG. 3), in this case, completion notification delay control section 1121 sends to CPU 1001 a completion notification for the data transfer using the second DMA parameter (a completion notification for transfer data no.(5) shown in FIG. 3) and the second completion notification.

This allows completion notification delay control section 1121 to send to the host system (CPU 1001) completion notifications for data transfers that use a plurality of DMA parameters set by the host system in the set order of the plurality of DMA parameters.

An example of a completion notification process for data transfer at data transfer control apparatus 1004 will now be described.

Figure 5:
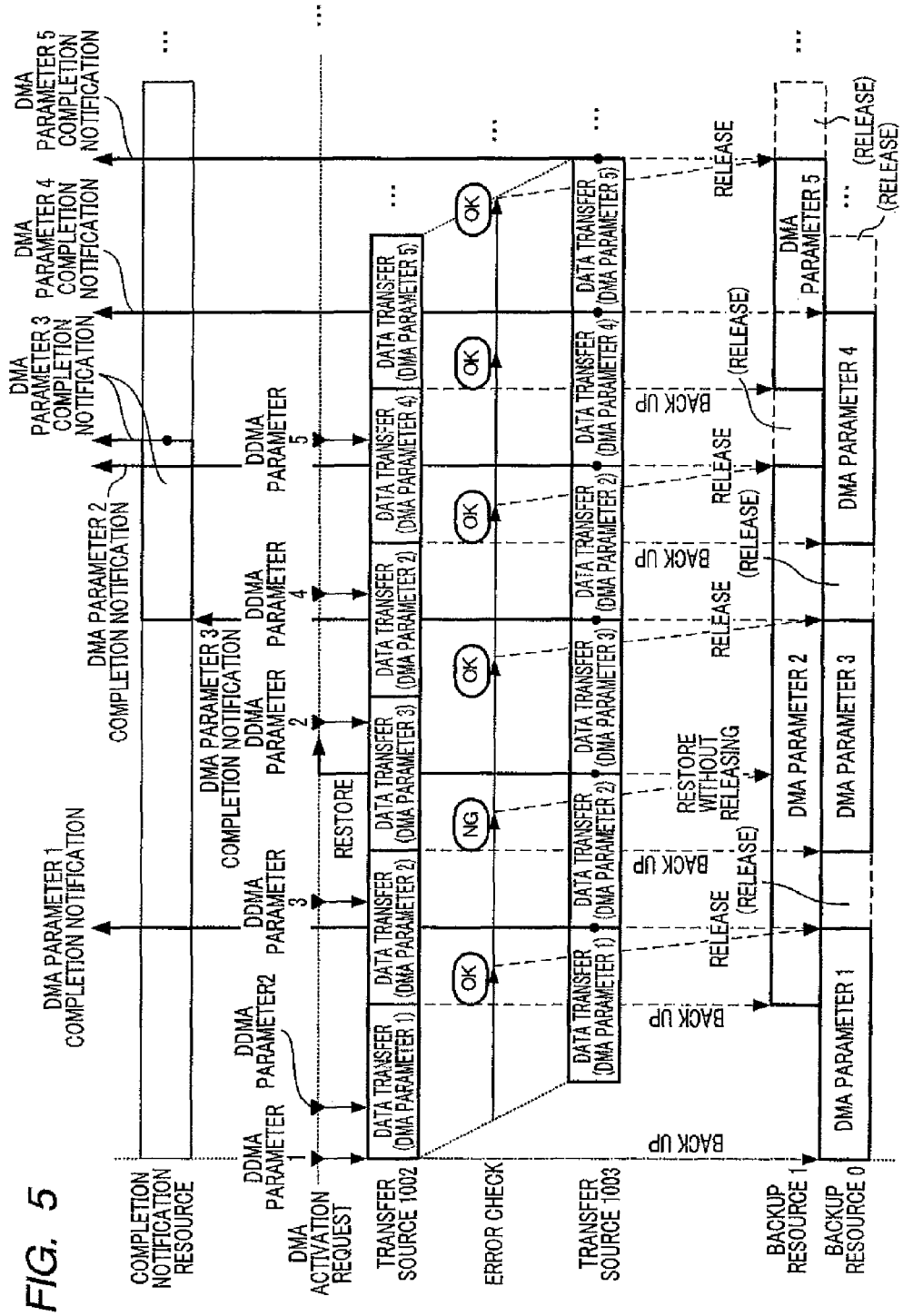
FIG. 5 illustrates an example of a completion notification process in accordance with Embodiment 1 of the claimed invention.

In the description below, DMA parameters 1, 2, 3, 4, 5 . . . are set by CPU 1001 as shown in FIG. 5. Thus, data transfer control apparatus 1004 uses DMA parameters 1, 2, 3, 4, 5 . . . in their set order to transfer the data received from transfer source 1002 to transfer destination 1003. As shown in FIG. 5, DMA parameter backup control section 1112 in data transfer control apparatus 1004 includes backup resources 0 and 1 to temporarily back up DMA parameters. Completion notification delay control section 1121 includes a completion notification resource to temporarily withhold completion notifications for transfer data. As shown in FIG. 5, by queuing DMA parameter settings and DMA activation requests, data transfer control apparatus 1004 starts the next data transfer as soon as the previous data transfer completes. In the following description, it is assumed that DMA parameters 1 to 5 are used for the same DMA channel.

As shown in FIG. 5, data transfer control apparatus 1004 first uses DMA parameter 1 to transfer the data received from transfer source 1002. As shown in FIG. 5, DMA parameter holding section 1114 backs up DMA parameter 1 in backup resource 0 in DMA parameter backup control section 1112. Data processing section 1201 performs data processing, e.g., error checking, and/or the like, on the transfer data (DMA parameter 1) received from transfer source 1002, and determines that the "processing result" is correct (OK).

Data transfer control apparatus 1004 then uses DMA parameter 2 to transfer the data received from transfer source 1002. As shown in FIG. 5, DMA parameter holding section 1114 backs up DMA parameter 2 in backup resource 1 in DMA parameter backup control section 1112. Data processing section 1201 performs data processing, e.g., error checking, and/or the like, on the transfer data (DMA parameter 2) received from transfer source 1002, and determines that the "processing result" is an error (NG).

As a data reception process using DMA parameter 1 is completed at transfer destination 1003 as shown in FIG. 5, completion determination section 1203 receives a completion notification from transfer destination 1003 for the data transfer using DMA parameter 1. At this point, completion notification delay control section 1121 directly outputs to CPU 1001 the completion notification (transfer completion interrupt) for the data transfer using DMA parameter 1. The completion notification is output directly because the "processing result" for the data transfer using DMA parameter 1 is correct and because no completion notification whose "processing result" is an error is queued at the completion notification resource (completion notification queue 2126). DMA parameter restoration control section 1122 issues an instruction to release DMA parameter 1 backed up in backup resource 0 in DMA parameter backup control section 1112.

Then, data transfer control apparatus 1004 uses DMA parameter 3 to transfer data received from transfer source 1002. As shown in FIG. 5, DMA parameter holding section 1114 backs up DMA parameter 3 in backup resource 0 in DMA parameter backup control section 1112. Data processing section 1201 performs data processing, e.g., error checking, and/or the like, on the transfer data (DMA parameter 3) received from transfer source 1002, and determines that the "processing result" is correct (OK).

As a data reception process using DMA parameter 2 is completed at transfer destination 1003 as shown in FIG. 5, completion determination section 1203 receives from transfer destination 1003 a completion notification for the data transfer using DMA parameter 2. At this point, completion notification delay control section 1121 discards the completion notification since its "processing result" is an error (NG). Information concerning the transfer data corresponding to the discarded completion notification is queued in completion notification queue 2126. The information concerning the transfer data includes, for example, transfer data no.(1), no.(4) and no.(5) (processing result: error) shown in FIG. 3.

DMA parameter restoration control section 1122 issues an instruction to restore DMA parameter 2 backed up in backup resource 1 in DMA parameter backup control section 1112, instead of releasing it. Thus, data transfer control apparatus 1004 performs a data transfer using restored DMA parameter 2 as soon as the data transfer already in progress using DMA parameter 3 is completed, as shown in FIG. 5. Data processing section 1201 performs data processing, e.g., error checking, and/or the like, on the transfer data (DMA parameter 2) received from transfer source 1002, and determines that the "processing result" is correct (OK).

As a data reception process using DMA parameter 3 is completed at transfer destination 1003 as shown in FIG. 5, completion determination section 1203 receives a completion notification from transfer destination 1003 for the data transfer using DMA parameter 3. At this point, at completion notification delay control section 1121, for the same DMA channel, an error has occurred with DMA parameter 2 used for a transfer preceding DMA parameter 3 used for the transfer data corresponding to the received completion notification. Completion notification delay control section 1121 withholds the received completion notification (DMA parameter 3) in the completion notification resource. In this case, DMA parameter 2, which is of an earlier set order than DMA parameter 3, is used for the next DMA transfer. DMA parameter restoration control section 1122 issues an instruction to release DMA parameter 3, which is backed up in backup resource 0 in DMA parameter backup control section 1112.

As shown in FIG. 5, the data reception process using DMA parameter 2 (restored DMA parameter) is then completed at transfer destination 1003. Once the data reception process is completed at transfer destination 1003, completion determination section 1203 receives from transfer destination 1003 a completion notification for the data transfer using DMA parameter 2. At this point, the "processing result" of the data transfer using DMA parameter 2 is correct, and completion notification delay control section 1121 receives a completion notification for the data transfer using the restored DMA parameter. Completion notification delay control section 1121 then collectively sends to the host system (CPU 1001 in this case) the received completion notification (DMA parameter 2) and the completion notification (DMA parameter 3) for the transfer data queued at the completion notification resource. DMA parameter restoration control section 1122 issues an instruction to release DMA parameter 2, which is backed up in backup resource 1 in DMA parameter backup control section 1112.

The same generally applies to the data transfers using DMA parameter 4 and DMA parameter 5 shown in FIG. 5.

Thus, data transfer control apparatus 1004 temporarily backs up the DMA parameter currently in use and, upon detection of a transfer data error, restores, for use in a subsequent data transfer, the DMA parameter used for the transfer data in which an error was detected. For example, in FIG. 5, data transfer control apparatus 1004 reuses (restores) DMA parameter 2, which was used for the transfer data in which an error was detected, to perform a subsequent data transfer. Thus, at transfer destination 1003, error data may be discarded by overwriting the error data with subsequent data.

If a subsequent data transfer is already being performed when a transfer data error is detected, data transfer control apparatus 1004 withholds the completion notification for the subsequent data transfer. More specifically, data transfer control apparatus 1004 has a queuing mechanism that withholds the completion notification for the subsequent data transfer until a data transfer reusing the DMA parameter used for the data transfer in which an error was detected is completed successfully. For example, in FIG. 5, data transfer control apparatus 1004 withholds the completion notification for the subsequent data transfer using DMA parameter 3 until a data transfer using DMA parameter 2, for which an error was detected, is completed successfully.

At the host system (CPU 1001), when a completion notification indicating successful completion of a data transfer using a given DMA parameter is received, this is recognized to mean that data transfers preceding the data transfer using that DMA parameter have also been completed successfully. At data transfer control apparatus 1004, on the other hand, a completion notification for a subsequent data transfer is withheld until a data transfer using a DMA parameter that caused an error is completed successfully. Thus, even if a subsequent data transfer is completed successfully before a data transfer in which an error occurred, false recognitions that an (uncompleted) data transfer using a DMA parameter that resulted in an error has been completed successfully may be prevented at the host system. Specifically, the host system (CPU 1001) receives completion notifications indicating successful completions of data transfers in the set order of the DMA parameters set by the host system.

By thus queuing DMA parameter settings and DMA activation requests, data transfer control apparatus 1004 is capable of improving data transfer efficiency. Data transfer control apparatus 1004 withholds a completion notification for a subsequent data transfer until a data transfer reusing a DMA parameter used for a data transfer in which an error was detected is completed successfully. Data transfer control apparatus 1004 is thus capable of achieving the discarding of error data at transfer destination 1003 while preventing false recognitions of data transfer status at the host system.

According to this embodiment, with respect to DMA transfer in which error detection is performed on transferred data, it is possible to improve data transfer efficiency while also discarding error data.

For example, a data transfer control apparatus in accordance with this embodiment makes it possible to improve the efficiency of data transfer with wireless LAN modules supporting the SDIO interface, devices supporting the USB interface, memory cards supporting SDXC, and so forth.

Embodiment 2

In Embodiment 1, a completion notification (successful completion) for a subsequent data transfer using another DMA parameter is withheld until a DMA parameter that was used in a data transfer corresponding to a completion notification that was discarded due to an error is restored and transfer is completed successfully. The DMA parameter used in the data transfer corresponding to the completion notification discarded due to an error is referred to here as "DMA parameter A." When the completion notification (successful completion) for the data transfer using the other DMA parameter is withheld for extended periods, problems may arise in terms of the responsiveness of the overall system. The completion notification for the data transfer using the other DMA parameter is withheld for extended periods when, for example, an error occurs again during the data transfer using restored DMA parameter A.

A data transfer control apparatus in accordance with Embodiment 2 sends an error interrupt to a host system in accordance with the circumstances of error occurrence.

Figure 6:
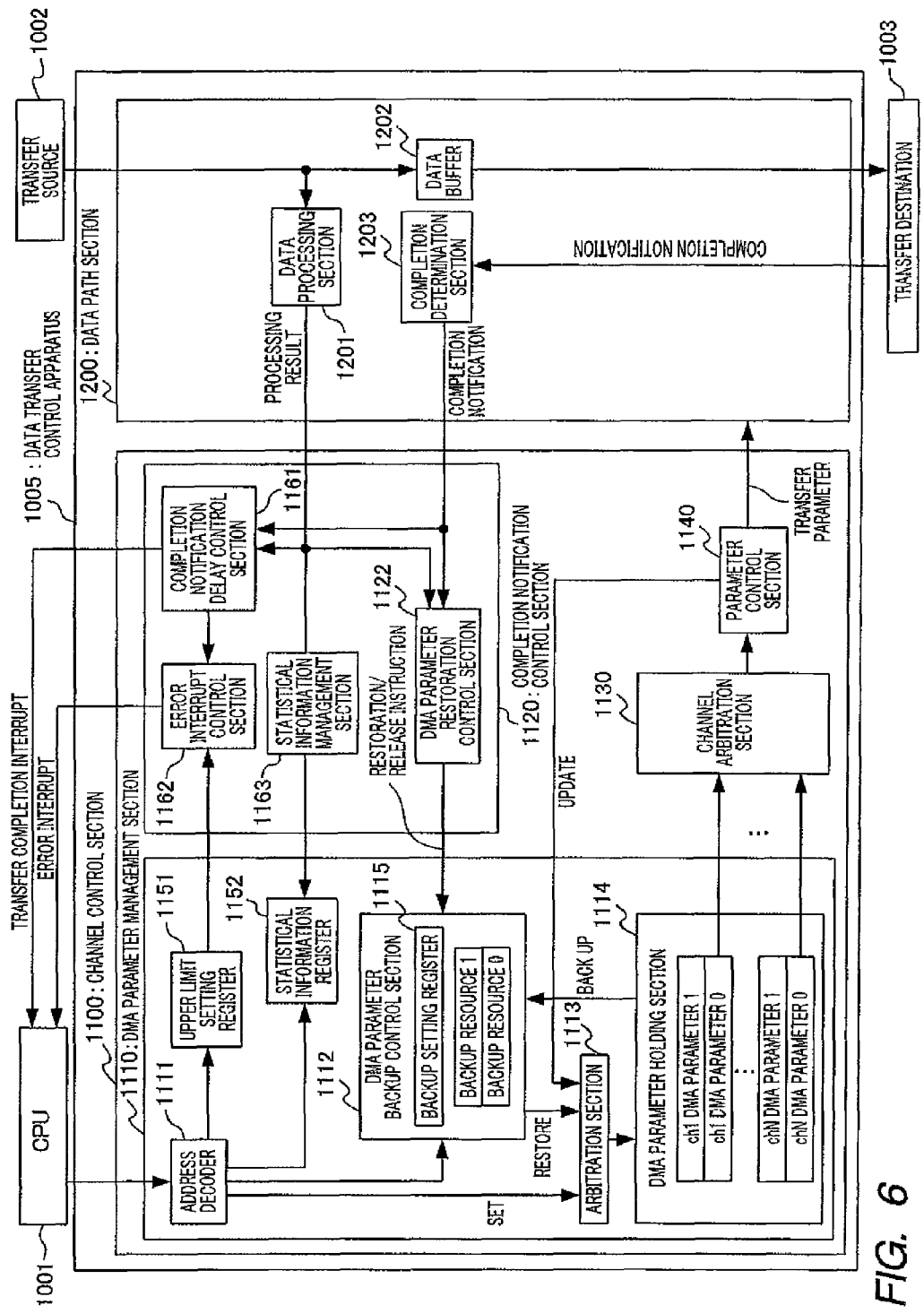
FIG. 6 is a block diagram illustrating a configuration of a data transfer system in accordance with Embodiment 2 of the claimed invention.

FIG. 6 illustrates a configuration of a data transfer system in accordance with Embodiment 2. In data transfer control apparatus 1005 shown in FIG. 6, DMA parameter management section 1150 in channel control section 1100 has a configuration different from that of Embodiment 1 (DMA parameter management section 1110 shown in FIG. 1). More specifically, in addition to the configuration of DMA parameter management section 1110 shown in FIG. 1, DMA parameter management section 1150 further includes upper limit setting register 1151 and statistical information register 1152.

Upper limit setting register 1151 holds an upper limit value for a determination parameter for determining, at completion notification delay control section 1161 (described hereinafter), the period over which a completion notification is to be withheld. The upper limit value is reported from CPU 1001 via address decoder 1111. Examples of criteria for determining, at completion notification delay control section 1161 (described hereinafter), the period for withholding a completion notification may include the following: The time elapsed from the detection of an error in a data transfer using a given DMA parameter; The number of completion notifications withheld at completion notification delay control section 1161; The frequency of error occurrences for each DMA channel; and/or the like.

Statistical information register 1152 holds statistical information calculated at statistical information management section 1163 (described hereinafter) concerning processing results at data processing section 1201. The statistical information concerning processing results includes, for example, number of errors, error occurrence rate, and/or the like. CPU 1001 issues a request to address decoder 1111 to read, for debugging and analysis, statistical information held on statistical information register 1152. At this point, address decoder 1111 selects, and outputs to CPU 1001, the statistical information held on statistical information register 1152.

In data transfer control apparatus 1005 shown in FIG. 6, completion notification control section 1160 in channel control section 1100 has a configuration different from that in Embodiment 1 (completion notification control section 1120 shown in FIG. 1). More specifically, in addition to the configuration of completion notification control section 1120 shown in FIG. 1, completion notification control section 1160 further includes error interrupt control section 1162 and statistical information management section 1163.

Completion notification delay control section 1161 in completion notification control section 1160 performs processing similar to that in Embodiment 1 (completion notification delay control section 1121). In addition, completion notification delay control section 1161 measures a determination parameter for determining the period over which a completion notification is to be withheld. The determination parameter, for example, may be the period from the detection of an error in a data transfer using a given DMA parameter up to the successful completion of a data transfer performed by restoring the DMA parameter used in the data transfer in which the error was detected. Alternatively, the determination parameter may be the number of completion notifications withheld at completion notification delay control section 1161, the frequency of errors for each DMA channel, and/or the like. If error interrupt control section 1162 sends an error interrupt request to the host system (CPU 1001), completion notification delay control section 1161 discards the completion notification received after the sending of the error interrupt request.

Error interrupt control section 1162 compares the determination parameter received from completion notification delay control section 1161 with the upper limit value for the determination parameter held by upper limit setting register 1151. Error interrupt control section 1162 controls the outputting of an error interrupt request to the host system (CPU 1001 in this case) based on the result of the comparison. More specifically, if the determination parameter is smaller than the upper limit, error interrupt control section 1162 does not send an error interrupt. Thus, completion notification delay control section 1161 continues to withhold the completion notification indicating successful completion of the data transfer. In contrast, if the determination parameter reaches the upper limit, error interrupt control section 1162 sends an error interrupt.

Statistical information register 1152 calculates statistical information concerning the processing results at data processing section 1201 (for example, number of errors, error occurrence rate, and/or the like), and outputs the calculated statistical information to statistical information register 1152.

The error interrupt control process for completion notifications at completion notification control section 1160 will now be described in detail below with respect to Cases 1 to 3 for the error interrupt control process for completion notifications.

<Case 1>

In Case 1, for the determination parameter for determining the period over which a completion notification is to be withheld, data transfer control apparatus 1005 uses the time elapsed from the detection of an error as a processing result at data processing section 1201.

Specifically, upper limit setting register 1151 holds an upper limit value for the period over which completion notification delay control section 1161 is allowed to withhold a completion notification from the time at which an error is detected as a processing result at data processing section 1201.

Figure 7:
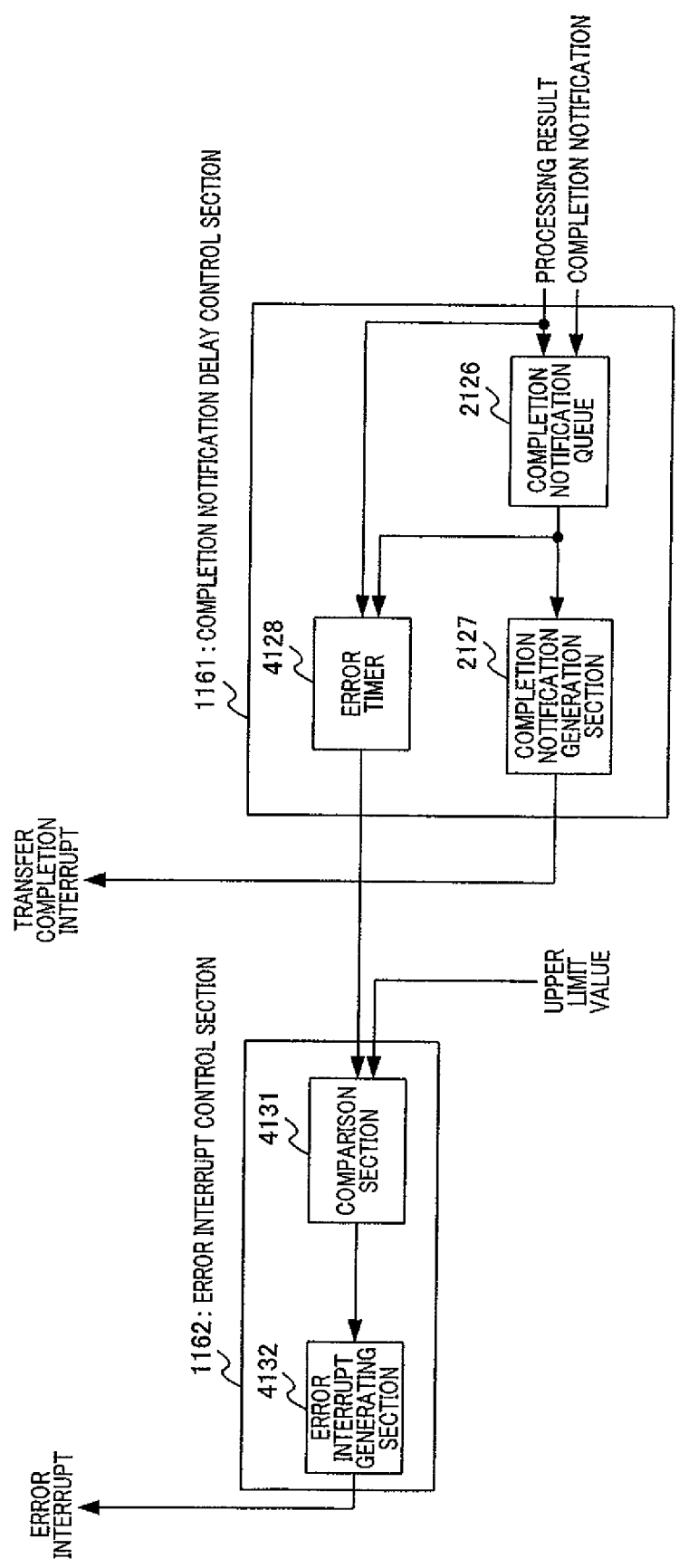
FIG. 7 is a block diagram illustrating an internal configuration of a completion notification delay control section and an internal configuration of an error assignment control section in accordance with Embodiment 2 of the claimed invention (Case 1)

FIG. 7 illustrates an internal configuration of completion notification delay control section 1161 and an internal configuration of error interrupt control section 1162.

The internal configuration of completion notification delay control section 1161 will now be described. As shown in FIG. 7, in addition to the configuration of Embodiment 1 (completion notification delay control section 1121), completion notification delay control section 1161 further includes error timer 4128.

In a certain case discussed below, error timer 4128 counts the time elapsed from error detection. The certain case referred to above is one where the processing result received from data processing section 1201 is an error, and where the completion notification corresponding to the error is the first completion notification queued in completion notification queue 2126 whose "processing result" is an error.

Data transfer using another DMA parameter may cause an error in a period from the detection of an error at data processing section 1201 up to the successful completion of a data transfer performed by restoring the DMA parameter used in the data transfer in which the error was detected. As such, in a certain case discussed below, error timer 4128 resets the measured value and starts measuring time. The certain case referred to above is one where, upon successful completion of the data transfer performed by restoring the DMA parameter used in a data transfer in which an error was detected earlier, the measured value (determination parameter) has not yet reached the upper limit value. In other words, the certain case referred to above is one where no error interrupt occurs.

A case where completion notification queue 2126 is as shown in FIG. 3 will now be described as an example:

With respect to FIG. 3, error timer 4128 starts measuring time when, of the queued completion notifications whose "processing result" is an error, the first error is detected. In other words, error timer 4128 starts measuring time upon receiving the processing result (error) for transfer data no.(1) shown in FIG. 3.

Error timer 4128 stops (resets) time measurement upon successful completion of a transfer of transfer data with the same DMA channel (ch1) and the same "error ID" (error ID=1) as the first "processing result: error" queued. The transfer data in this case is transfer data that uses a restored DMA parameter, and is, for example, transfer data no.(6) shown in FIG. 3. Thus, error timer 4128 measures the period from when an error is detected up to when a data transfer performed by restoring the DMA parameter that was used for the data transfer in which an error was detected is completed successfully.

In FIG. 3, by the time the transfer of the transfer data of DMA channel 1 (ch1) and error ID=1 (no.(6)) is completed successfully, errors in data transfers using other DMA parameters have occurred (nos.(4) and (5)). Upon receiving the processing result (correct) for transfer data no.(6), error timer 4128 resets the measured time and starts measuring time again.

An internal configuration of error interrupt control section 1162 will now be described. Error interrupt control section 1162 shown in FIG. 7 includes comparison section 4131 and error interrupt generating section 4132.

Comparison section 4131 compares the measured value received from error timer 4128 with an upper limit value held on upper limit setting register 1151. Comparison section 4131 outputs the comparison result to error interrupt generating section 4132.

If error interrupt generating section 4132 receives from comparison section 4131 a comparison result indicating that the measured value is smaller than the upper limit value (measured value<upper limit value), it does nothing. In contrast, if error interrupt generating section 4132 receives from comparison section 4131 a comparison result indicating that the measured value has reached the upper limit value (measured value=upper limit value), it generates an error interrupt request and outputs it to the host system (CPU 1001 in this case).

If, as in Embodiment 1, successful data transfers are to be performed in the set order of the DMA parameters set by the host system (CPU 1001), data transfer control apparatus 1005 may notify the host system (CPU 1001) of the following: that data transfer is hindered as a result of completion notifications for successful data transfers being withheld due to an error in some other data transfer. In other words, the host system (CPU 1001) capable of detecting the fact that data transfer is hindered at data transfer control apparatus 1005.

FIG. 7 illustrates a case where just one error timer 4128 is provided. However, data transfer control apparatus 1005 is by no means limited as such and may be provided with a plurality of error timers 4128 to check, with respect to a plurality of errors, how hindered data transfers are due to errors.

<Case 2>

In Case 2, data transfer control apparatus 1005 uses the number of completion notifications withheld at completion notification delay control section 1161 as a determination parameter for determining the period over which a completion notification is to be withheld.

Specifically, upper limit setting register 1151 holds an upper limit value for the number of completion notifications that can be withheld at completion notification delay control section 1161.

Figure 8:
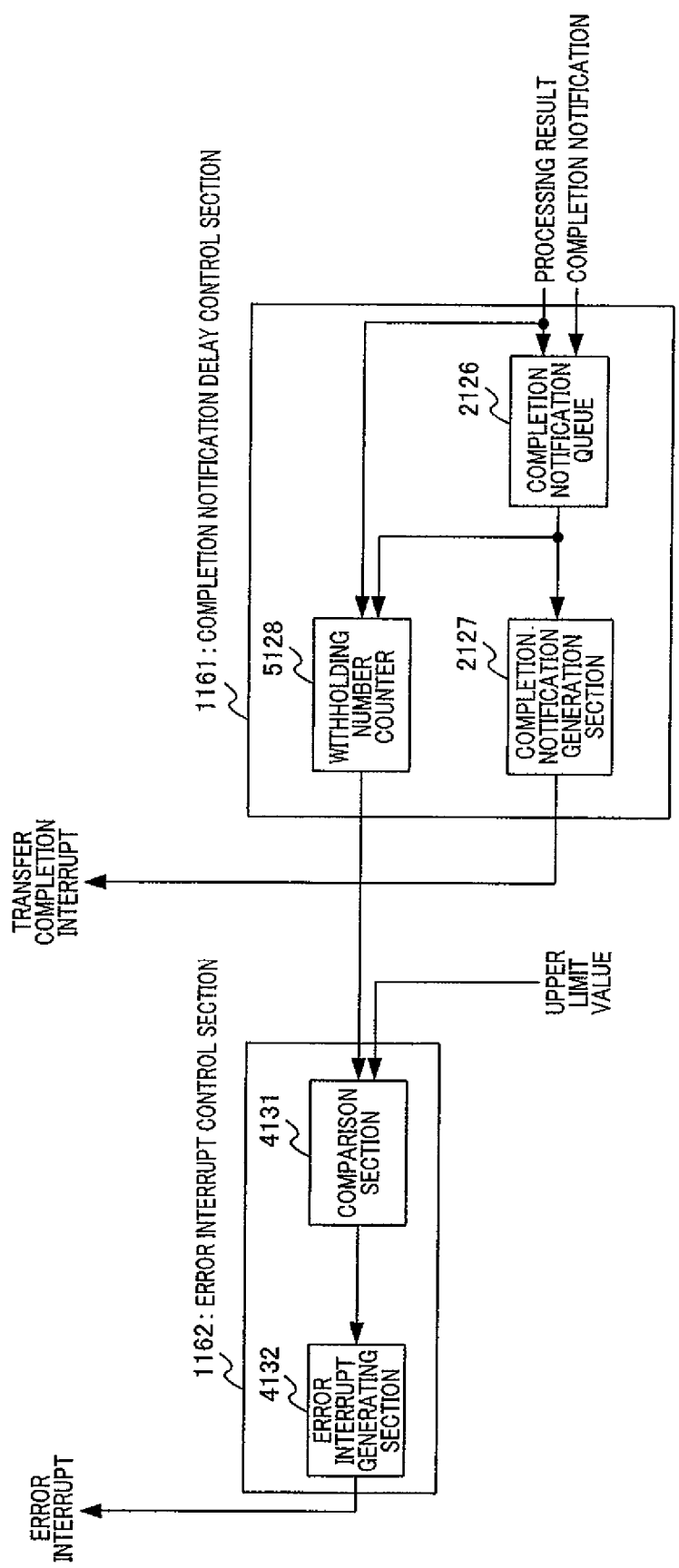
FIG. 8 is a block diagram illustrating an internal configuration of a completion notification delay control section and an internal configuration of an error assignment control section in accordance with Embodiment 2 of the claimed invention (Case 2)

FIG. 8 illustrates an internal configuration of completion notification delay control section 1161 and an internal configuration of error interrupt control section 1162. Case 2 differs from Case 1 that completion notification delay control section 1161 shown in FIG. 8 includes withholding number counter 5128 in place of error timer 4128.

With reference to FIG. 8, in a certain case discussed below, withholding number counter 5128 resets the withholding number count. The certain case referred to above is one where the processing result received from data processing section 1201 is an error, and where the completion notification corresponding to the error is the first completion notification queued in completion notification queue 2126 whose "processing result" is an error. During a certain period discussed below, withholding number counter 5128 counts how many times data transfers using other DMA parameters have been completed successfully. The certain period referred to above is the period from when an error is detected up to when a data transfer performed by restoring the DMA parameter used for the data transfer in which the error was detected is completed successfully. The number of times data transfers using other DMA parameters have been completed successfully equals the number of completion notifications withheld at completion notification delay control section 1161.

A case where completion notification queue 2126 is as shown in FIG. 3 will now be described as an example.

With reference to FIG. 3, in a certain period discussed below, withholding number counter 5128 counts, of the queued completion notifications whose "processing result" is an error, the number of completion notifications queued in completion notification queue 2126 whose "processing result" is correct. The certain period referred to above is the period from when the first error is detected up to when the transfer of transfer data of the same DMA channel (ch1) and the same "error ID" (error ID=1) as the first "processing result: error" queued is completed successfully. The time at which the first error is detected is, for example, the time at which the processing result (error) for transfer data no.(1) shown in FIG. 3 is received. The transfer data in this case is transfer data that uses a restored DMA parameter. This transfer data is, for example, transfer data no.(6) shown in FIG. 3. Specifically, with respect to FIG. 3, withholding number counter 5128 counts two completion notifications, namely those of transfer data nos.(2) and (3).

If the number of completion notifications counted by withholding number counter 5128 has reached the upper limit value pre-set on upper limit setting register 1151, error interrupt control section 1162 issues an error interrupt request to the host system (CPU 1001).

If successful data transfers are to be performed in the set order of the DMA parameters set by the host system (CPU 1001), data transfer control apparatus 1005 may, as in Case 1, notify the host system (CPU 1001) of the following: that data transfer is hindered as a result of completion notifications for successful data transfers being withheld due to an error in some other data transfer. In other words, the host system (CPU 1001) is capable of detecting the fact that data transfer is hindered at data transfer control apparatus 1005.

There is a limit to the number of completion notifications that can be queued in completion notification queue 2126. Data transfer control apparatus 1005 is therefore capable of notifying the host system that the maximum number queueable in completion notification queue 2126 has been reached (or that it will likely be reached).

FIG. 8 illustrates a case where just one withholding number counter 5128 is provided. However, data transfer control apparatus 1005 is by no means limited as such and may be provided with a plurality of withholding number counters 5128 to check, with respect to a plurality of errors, how hindered data transfers are due to errors.

<Case 3>

In Case 3, data transfer control apparatus 1005 uses the frequency of errors detected at data processing section 1201 as a determination parameter for determining the period over which a completion notification is to be withheld.

In other words, upper limit setting register 1151 holds an upper limit value for the frequency of errors detected at data processing section 1201.

Figure 9:
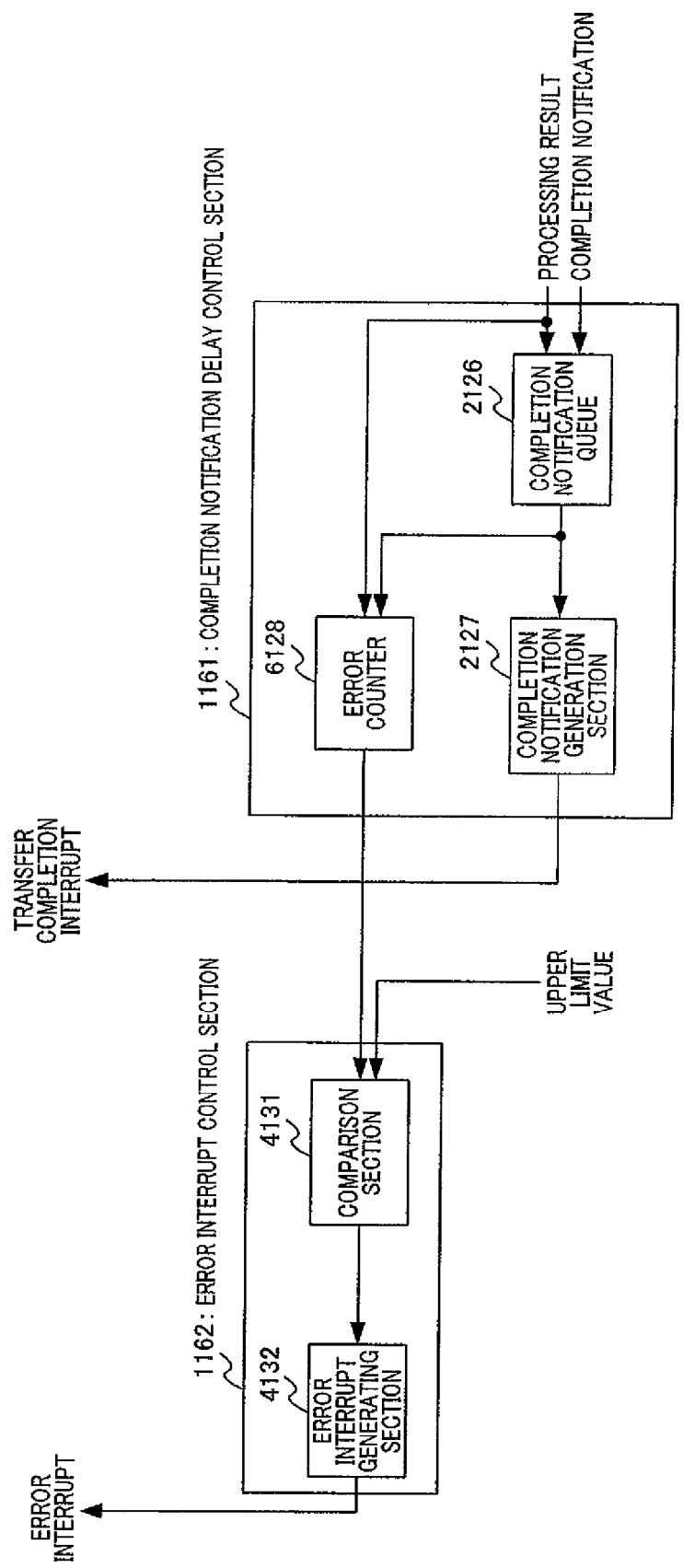
FIG. 9 is a block diagram illustrating an internal configuration of a completion notification delay control section and an internal configuration of an error assignment control section in accordance with Embodiment 2 of the claimed invention (Case 3)

FIG. 9 shows an internal configuration of completion notification delay control section 1161 and an internal configuration of error interrupt control section 1162. Case 3 differs from Case 1 in that completion notification delay control section 1161 shown in FIG. 9 includes error counter 6128 in place of error counter 4128.

With reference to FIG. 9, if the processing result received from data processing section 1201 is an error, error counter 6128 increments the error count. In contrast, in a certain case discussed below, error counter 6128 decrements the error count. The certain case referred to above is one where a completion notification of the same DMA channel and the same "error ID" as a "processing result: error" queued in completion notification queue 2126, and whose "processing result" is correct, is received. In other words, the certain case referred to above is one where a completion notification (correct) for data transfer using a restored DMA parameter is received.

A case where completion notification queue 2126 is as shown in FIG. 3 will now be described as an example.

With reference to FIG. 3, the transfer data whose "processing result" is an error are transfer data nos.(1), (4) and (5).

Thus, error counter 6128 increments the error count every time a completion notification corresponding to such transfer data whose "processing result" is an error is received.

In a certain case discussed below, error counter 6128 decrements the error count. The certain case referred to above is one where a completion notification corresponding to transfer data of the same DMA channel (ch1) and the same error ID (error ID=1) as the queued transfer data of "processing result: error," and whose "processing result" is correct, is received as a correct "processing result." In other words, it is one where a completion notification corresponding to transfer data using a restored DMA parameter is received. The queued transfer data of "processing result: error" is, for example, transfer data no.(1) shown in FIG. 3. In FIG. 3, the transfer data of the same DMA channel (ch1) and "error ID" (error ID=1) as transfer data no.(1), and whose "processing result" is correct, is transfer data no.(6).

If the error count at error counter 6128 reaches the upper limit value pre-set on upper limit setting register 1151, error interrupt control section 1162 issues an error interrupt request to the host system (CPU 1001).

If correct data transfers are to be performed in the set order of the DMA parameters set by the host system (CPU 1001), data transfer control apparatus 1005 may, as in Case 1 and Case 2, notify the host system (CPU 1001) of the following: that data transfer is hindered as a result of completion notifications for successful data transfers being withheld due to an error in some other data transfer. In other words, the host system (CPU 1001) is capable of detecting the fact that data transfer is hindered at data transfer control apparatus 1005.

In a certain case discussed below, data transfer control apparatus 1005 can notify the host system (CPU 1001) of a situation in which errors occur frequently due to poor communication conditions between transfer source 1002 and data transfer control apparatus 1005. The certain case referred to above is one where a check sum error is detected for a packet received from a wireless LAN device (transfer source 1002) supporting the SDIO interface.

FIG. 9 illustrates a case where just one error counter 6128 is provided. However, data transfer control apparatus 1005 is by no means limited as such and may be provided with a plurality of error counters 6128 to check, with respect to a plurality of errors, how hindered data transfers are due to errors.

Cases 1 to 3 of an error interrupt control process for completion notifications have been described above.

A completion notification process flow for data transfer at data transfer control apparatus 1005 will now be described. Case 3 (error interrupt processing based on the frequency of errors) is taken as an example.

Figure 10:
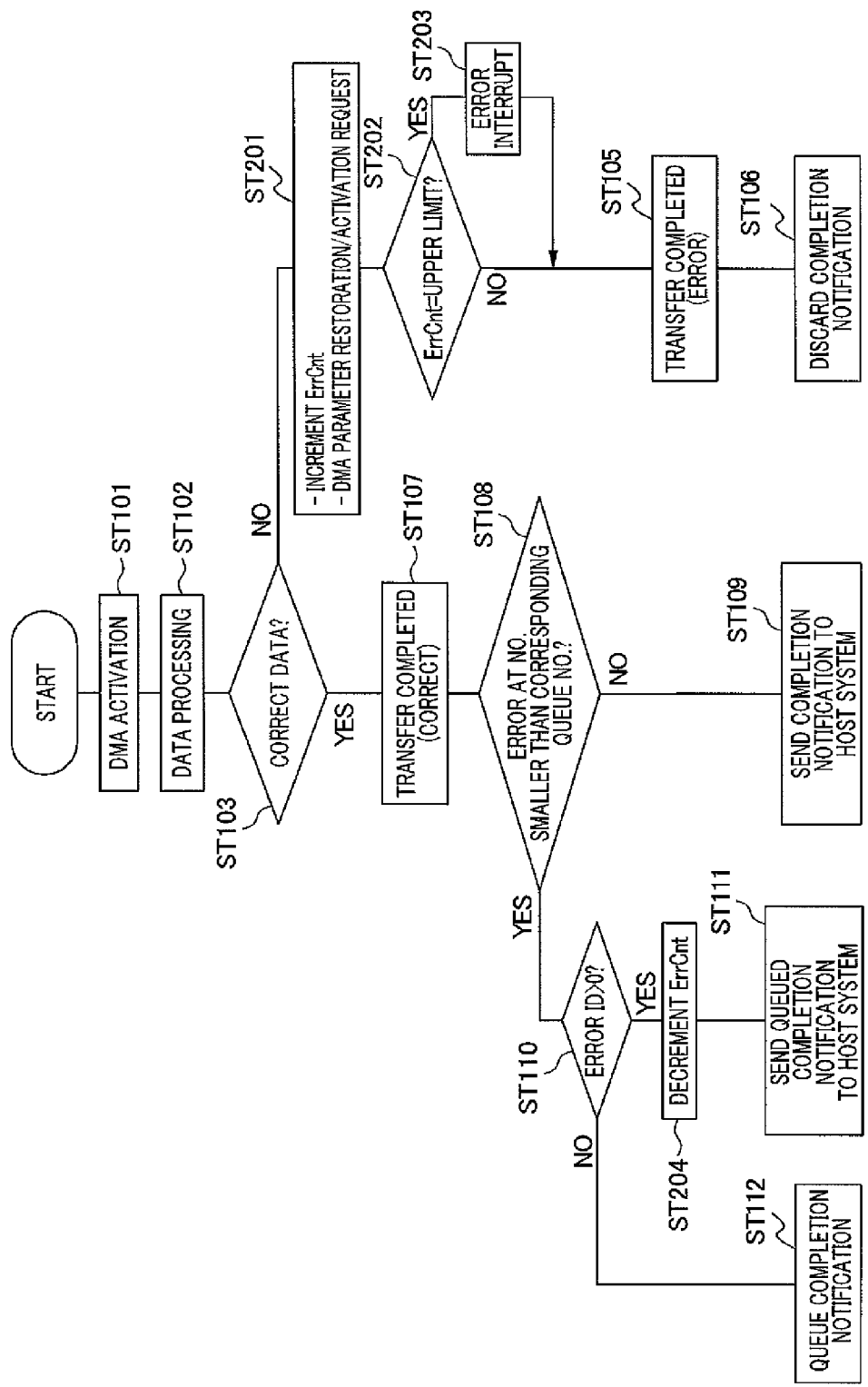
FIG. 10 is a flow chart illustrating a completion notification process flow in accordance with Embodiment 2 of the claimed invention.

FIG. 10 is a flow chart illustrating a completion notification process flow for data transfer at data transfer control apparatus 1005. In FIG. 10, like steps to those in Embodiment 1 (FIG. 4) are designated with like reference numerals, while omitting descriptions in regard thereto.

If the processing result for the transfer data is an error in ST 103 in FIG. 10 (ST 103: NO), the flow proceeds to ST201. In ST201, data transfer control apparatus 1005 (error counter 6128) increments error count ErrCnt. Data transfer control apparatus 1005 (DMA parameter restoration control section 1122) issues to DMA parameter backup control section 1112, as in Embodiment 1, a restoration request for the DMA parameter that was used for the transfer data whose processing result was an error. This is to re-perform data transfer by restoring the DMA parameter that was used for the transfer data whose processing result was an error.

In ST202, data transfer control apparatus 1005 (comparison section 4131) compares error count ErrCnt counted by error counter 6128 with the upper limit value held on upper limit setting register 1151. Comparison section 4131 determines whether or not ErrCnt has reached the upper limit value (whether or not ErrCnt=upper limit value) based on the comparison result.

When ErrCnt reaches the upper limit value (ST202: YES), the flow proceeds to ST203. In ST203, data transfer control apparatus 1005 (error interrupt generating section 4132) issues an error interrupt request to the host system (CPU 1001 in this case). If ErrCnt has not reached the upper limit value (ST202: NO), error interrupt generating section 4132 does nothing and proceeds to ST 105.

If the error ID is greater than 0 (ST 110: YES), the flow proceeds to ST204. The error ID is greater than 0 (ST 110: YES) when the transfer of the transfer data for which a completion notification was received in ST 107 is a data transfer using a restored DMA parameter. In ST204, data transfer control apparatus 1005 (error counter 6128) decrements error count ErrCnt.

Thus, in accordance with this embodiment, data transfer control apparatus 1005 queues, as in Embodiment 1, DMA parameter settings and DMA activation requests. Data transfer control apparatus 1005 withholds, as in Embodiment 1, a completion notification for a subsequent data transfer until a data transfer that restores and reuses a DMA parameter that was used for a data transfer in which an error was detected is completed successfully. Data transfer control apparatus 1005 is thus capable of, with respect to DMA transfer in which error detection is performed on transferred data, improving data transfer efficiency while also discarding error data.

Data transfer control apparatus 1005 sends an error interrupt request to the host system depending on the circumstances of error occurrence and discards the completion notification received after sending the error interrupt request. The host system is thus capable of detecting, even if data transfer errors are frequent, the fact that data transfer is hindered at data transfer control apparatus 1005.

Embodiments of the claimed invention have been described above.

For the above embodiments, descriptions have been provided with respect to cases where a common queue is used for all DMA channels, as in completion notification queue 2126 (FIG. 3). With the claimed invention, however, a data transfer control apparatus may instead include, for example, an individual queue for each DMA channel, as shown in FIG. 11.

For the above embodiments, descriptions have been provided with respect to cases where DMA parameter backup control section 1112 in the data transfer control apparatus backs up in backup resources all DMA parameters set by the host system. With the claimed invention, however, DMA parameter backup control section 1112 in the data transfer control apparatus may instead back up, in back resources and of the plurality of DMA parameters set by the host system, just those DMA parameters that have been updated during data transfer.

Figure 12:
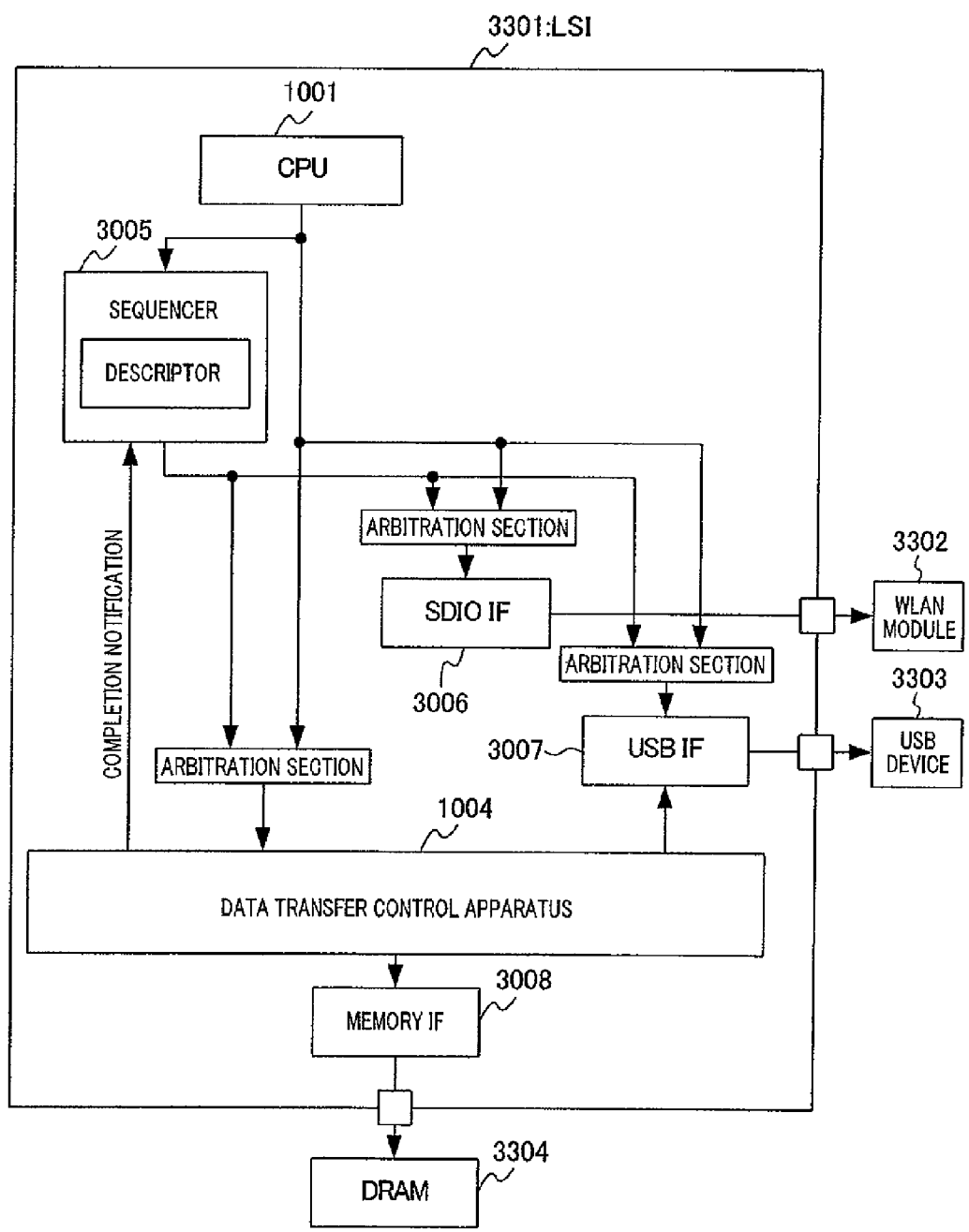
FIG. 12 is a block diagram illustrating a configuration of another data transfer system in accordance with the claimed invention.

For the above embodiments, descriptions have been provided with respect to cases where the host system is a CPU. The host system, however, is by no means limited to a CPU, and may be, for example, a sequencer. FIG. 12 shows a configuration example of a data transfer system in which the host system is a sequencer. In FIG. 12, sequencer 3005 controls peripheral interfaces and data transfer control apparatus 1004 (or data transfer control apparatus 1005) in accordance with descriptors set by CPU 1001. The peripheral interfaces include, for example, SDIO interface 3006 and USB interface 3007. If sequencer 3005 manages descriptors using pointers that update the descriptors one by one by FIFO, data transfer control apparatus 1004 individually sends to sequencer 3005 completion notifications for data transfers (transfer completion interrupts) one by one. Sequencer 3005 sets each DMA parameter for data transfer control apparatus 1004 based on descriptors set by CPU 1001. FIG. 12 illustrates a case where descriptors are set on sequencer 3005. CPU 1001, however, may store descriptors on DRAM3304. Sequencer 3005 may then use a DMA channel of data transfer control apparatus 1004 to transfer descriptors from DRAM3304 to a local memory area inside sequencer 3005.

Figure 13:
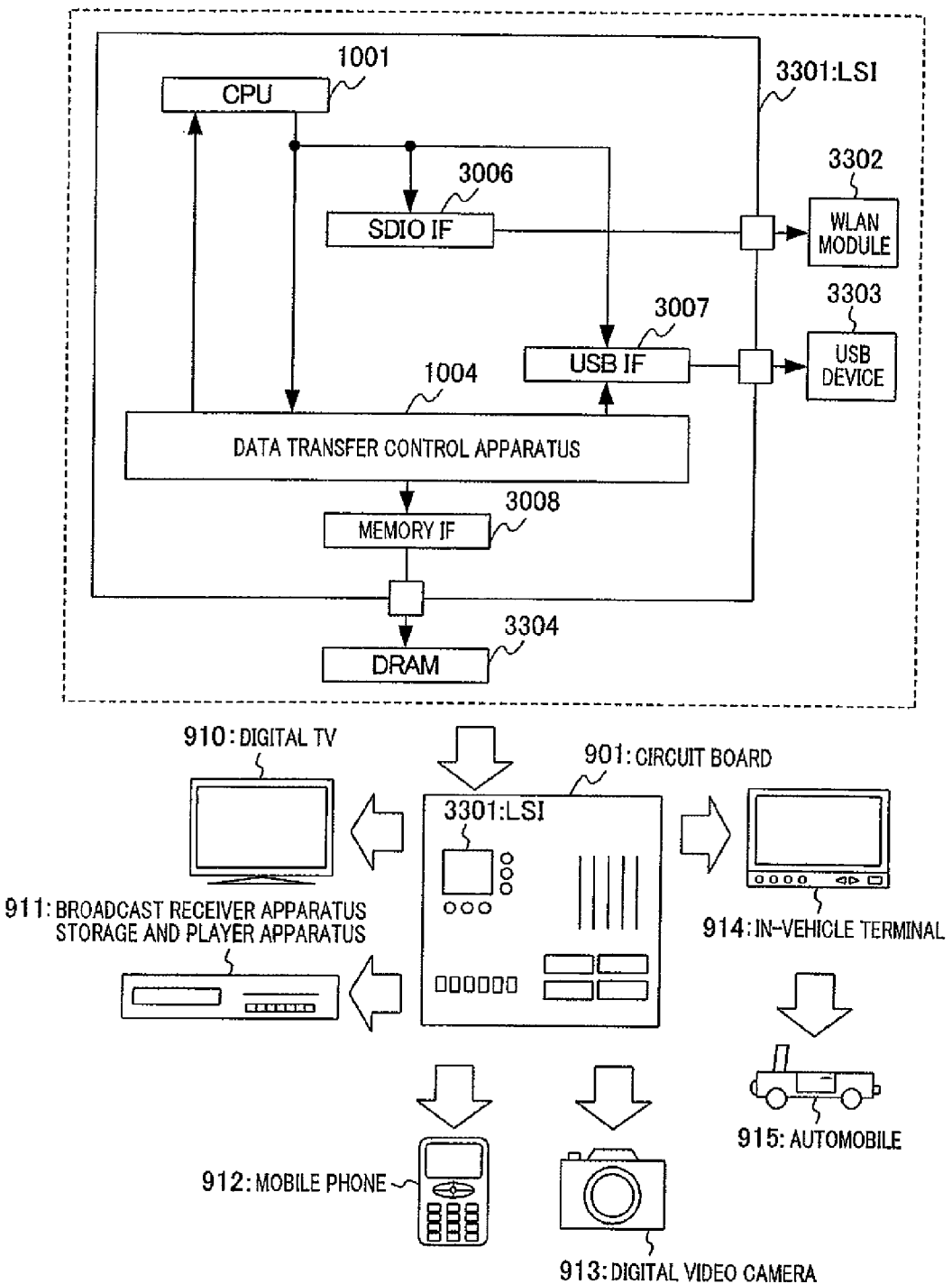
FIG. 13 is a block diagram illustrating an application example of a data transfer system in accordance with the claimed invention.

A data transfer system including a data transfer control apparatus in accordance with the above embodiments is useful in, for example, integrated circuit products involving a plurality of data transfers between storage areas as shown in FIG. 13. By "between storage areas," what is meant is, for example, between WLAN module 3302 and DRAM3304 and between USB connector 8303 and DRAM 3304. Integrated circuit products include, for example, circuit board 901 including LSI 3301. A data transfer system including a data transfer control apparatus in accordance with the above embodiments is also useful for, for example, digital home appliance products, personal computers and mobile terminals (for example, mobile phone 912 shown in FIG. 13). Digital home appliance products include, for example, digital TV 910, broadcast receiver apparatus (storage and player apparatus) 911, digital video camera 913, in-vehicle terminal 914, automobile 915, and/or the like, as shown in FIG. 13.

The DMA parameters are sometimes referred to as DMA commands.

Each means described in the above embodiments is typically achieved by an LSI (Large Scale Integration), which is an integrated circuit. These means may be embodied individually as single chips, or some or all of them may be so embodied as to be included in a single chip. Although they are referred to as LSIs here, they may be called ICs, system LSIs, super LSIs or ultra LSIs depending on their degree of integration. The integration methods are by no means limited to LSIs, and may be carried out through dedicated circuits or general-purpose processors. With the embodiments above, each section may be configured with an FPGA (Field Programmable Gate Array), which is programmable after LSI production. With the embodiments above, each section may be configured with configurable processors in which circuit cell connections and configurations inside the LSI are reconfigurable. With the embodiments above, each section may be integrated through circuit integration technologies replacing LSI that are brought about by advancements in semiconductor technology or by other technologies derived therefrom. For the embodiments above, integration may also be carried out, for example, by applying biotechnology.

The disclosed contents of the specification, drawings and abstract of Japanese Patent Application No. 2010-168217 filed on Jul. 27, 2010, are incorporated herein by reference in their entirety.

INDUSTRIAL APPLICABILITY

The claimed invention enables efficient transfer control in cases where a plurality of data transfers are executed. In particular, in cases where transfer size varies among data transfers, or where the same transfer is repeatedly performed due to data transfer anomalies, the claimed invention significantly reduces data transfer latency as compared to related art, and dramatically improves data transfer throughput. Thus, the claimed invention is useful in integrated circuit products that perform data transfer between a main storage apparatus and a high-speed I/O interface, such as SDXC, USB, and SATA. The claimed invention is also useful in, for example, integrated circuit products, digital home appliance products, personal computers and mobile phones that involve a plurality of data transfers between storage areas.

REFERENCE SIGNS LIST

1001 CPU
1002 transfer source
1003 transfer destination
1004, 1005 data transfer control apparatus
1100 channel control section
1200 data path section
1110, 1150 DMA parameter management section
1120, 1160 completion notification control section
1130 channel arbitration section
1140 parameter control section
1111 address decoder
1112 DMA parameter backup control section
1113 arbitration section
1114 DMA parameter holding section
1115 backup setting register
1121, 1161 completion notification delay control section
1122 DMA parameter restoration control section
1201 data processing section
1202 data buffer
1203 completion determination section
2126 completion notification queue
2127 completion notification generation section
1151 upper limit setting register
1152 statistical information register
1162 error interrupt control section
1163 statistical information management section
4128 error timer
4131 comparison section
4132 error interrupt generating section
5128 withholding number counter
6128 error counter

The invention claimed is:

1. A data transfer control apparatus which is capable of accepting, during data transfer, an activation request for a subsequent data transfer and a parameter setting used for data transfer, and which processes, in a set order, a plurality of activation requests made by a host system, the data transfer control apparatus comprising:
　　a backup control section that temporarily backs up a plurality of parameters in a backup resource;
　　a data processing section that performs an error detection process on transferred data;
　　a restoration control section that restores, from the backup resource and as a parameter for subsequent data transfers, a parameter used to transfer data for which the processing result of the error detection process is an error; and
　　a completion notification control section that withholds a completion notification to the host system indicating, with respect to the plurality of parameters, that a data transfer using each parameter has been completed successfully, the completion notification being withheld until a data transfer using a parameter for which the set order precedes that of the each parameter is completed successfully,
　　wherein the parameter includes information indicating whether the error detection process has been carried out on data transferred using the parameter.

2. The data transfer control apparatus according to claim 1, wherein the completion notification control section
sends to the restoration control section a request for restoring, from the backup resource and as a parameter for subsequent data transfers, the parameter used to transfer data for which the processing result is an error, and
sends to the restoration control section a request for releasing, from the backup resource, the parameter used to transfer data for which the processing result is correct.

3. The data transfer control apparatus according to claim 1, wherein if, during a period from a transfer of data for which the processing result is an error up to when a data transfer performed by restoring a first parameter used to transfer data for which the processing result is an error is completed successfully, a data transfer using a second parameter different from the first parameter is completed successfully, the completion notification control section withholds a completion notification for the data transfer using the second parameter, and, once the data transfer using the first parameter is completed successfully, sends to the host system a completion notification for the data transfer that uses the first parameter and the completion notification for the data transfer that uses the second parameter.

4. The data transfer control apparatus according to claim 3, wherein the completion notification control section simultaneously sends to the host system the completion notification for the data transfer that uses the first parameter and the withheld completion notification for the data transfer that uses the second parameter.

5. The data transfer control apparatus according to claim 3, wherein the completion notification control section individually sends to the host system, one by one, the completion notification for the data transfer that uses the first parameter and the withheld completion notification for the data transfer that uses the second parameter.

6. The data transfer control apparatus according to claim 1, wherein
if the processing result is an error in a second transfer using a second parameter different from a first parameter, the second data transfer being performed during a period from a first transfer of data for which the processing result is an error up to when a data transfer performed by restoring the first parameter used for the first transfer is completed successfully,
the completion notification control section withholds in an identifiable manner a first completion notification and a second completion notification, the first completion notification being for a data transfer performed between the first transfer and the second transfer using a parameter different from both the first parameter and the second parameter and for which the processing result is correct, and the second completion notification being for a data transfer performed using a parameter different from both the first parameter and the second parameter during a period from the second transfer up to when a data transfer performed by restoring the first parameter is completed successfully and for which the processing result is correct;
if the data transfer performed by restoring the first parameter is successfully completed, the completion notification control section sends to the host system a completion notification for the data transfer that uses the first parameter, and the first completion notification; and
if a data transfer performed by restoring the second parameter is successfully completed, the completion notification control section sends to the host system a completion notification for the data transfer that uses the second parameter, and the second completion notification.

7. The data transfer control apparatus according to claim 1, further comprising an error interrupt control section that sends to the host system an error interrupt request depending on an error occurrence circumstance with respect to the error detection process, wherein
if the error interrupt control section sends to the host system the error interrupt request, the completion notification control section discards a completion notification received after the error interrupt request is sent.

8. The data transfer control apparatus according to claim 7, wherein if the number of completion notifications withheld at the completion notification control section reaches a preset upper limit value during a period from when an error is detected in the error detection process up to when a data transfer performed by restoring a parameter used in a data transfer for which the error was detected is completed successfully, the error interrupt control section sends to the host system the error interrupt request.

9. The data transfer control apparatus according to claim 7, wherein if a period of from when an error is detected in the error detection process up to when a data transfer performed by restoring a parameter used in a data transfer for which the error was detected is completed successfully reaches a preset upper limit value, the error interrupt control section sends to the host system the error interrupt request.

10. The data transfer control apparatus according to claim 7, wherein if the number of errors detected in the error detection process reaches a preset upper limit value, the error interrupt control section sends to the host system the error interrupt request.

11. The data transfer control method according to claim 1, wherein, of the plurality of parameters, the backup control section only backs up, in the backup resource, parameters updated during data transfer.

12. The data transfer control apparatus according to claim 1, wherein the host system is a central processing unit or a sequencer.

13. The data transfer control apparatus according to claim 12, wherein the sequencer manages descriptor management areas with a pointer that updates the descriptor management areas one by one.

14. A data transfer control method for a data transfer control apparatus which is capable of accepting, during data transfer, an activation request for a subsequent data transfer and a parameter setting used for data transfer, and which processes, in a set order, a plurality of activation requests made by a host system, the method comprising:
temporarily backing up a plurality of parameters in a backup resource;
performing an error detection process on transferred data;
restoring, from the backup resource and as a parameter for subsequent data transfers, a parameter used to transfer data for which a processing result of the error detection process is an error; and
withholding a completion notification to the host system indicating, with respect to the plurality of parameters, that a data transfer using each parameter has been completed successfully, the completion notification being withheld until a data transfer using a parameter for which the set order is earlier than that of the each parameter is completed successfully,
wherein the parameter includes information indicating whether the error detection process has been carried out on data transferred using the parameter.

* * * * *